United States Patent [19]

Serikawa et al.

[11] Patent Number: 5,148,212
[45] Date of Patent: Sep. 15, 1992

[54] FLASH CONTROL BASED ON CALCULATED REQUIRED FLASH ENERGY

[75] Inventors: Yoshio Serikawa, Ageo; Susumu Iguchi, Kawasaki; Akira Ueno, Tokyo; Hiroshi Takeda, Funabashi; Shigeru Mitsu, Kawasaki; Kenji Koyama; Yukihisa Narazaki, both of Yokohama; Yoshihiko Shimura, Ichikawa, all of Japan

[73] Assignee: Ricoh Company, Ltd., Tokyo, Japan

[21] Appl. No.: 643,480

[22] Filed: Jan. 22, 1991

[30] Foreign Application Priority Data

| Jan. 23, 1990 | [JP] | Japan | 2-4301[U] |
| Jan. 23, 1990 | [JP] | Japan | 2-11815 |
| Jan. 23, 1990 | [JP] | Japan | 2-11816 |
| Jan. 23, 1990 | [JP] | Japan | 2-11817 |
| Feb. 14, 1990 | [JP] | Japan | 2-31539 |
| Mar. 5, 1990 | [JP] | Japan | 2-51908 |
| Mar. 5, 1990 | [JP] | Japan | 2-51909 |
| Mar. 9, 1990 | [JP] | Japan | 2-59755 |
| Oct. 25, 1990 | [JP] | Japan | 2-285885 |

[51] Int. Cl.$^5$ .......................... G03B 15/05
[52] U.S. Cl. ................... 354/416; 354/418
[58] Field of Search .......... 354/416, 417, 418, 145.1; 315/241 P

[56] References Cited

U.S. PATENT DOCUMENTS

| 3,868,701 | 2/1975 | Kawasaki | 354/416 X |
| 4,199,242 | 4/1980 | Hosimizu et al. | 354/145.1 |
| 4,266,163 | 5/1981 | Lloyd | 354/416 X |
| 4,275,335 | 6/1981 | Ishida | 315/241 P |
| 4,336,481 | 6/1982 | Numata | 315/241 P |
| 4,416,524 | 11/1983 | Takayama | 354/416 |
| 4,470,684 | 9/1984 | Harvey | 354/145.1 X |
| 4,486,086 | 12/1984 | Kresock | 354/416 |
| 4,494,850 | 1/1985 | Katsuma et al. | 354/416 |
| 4,523,830 | 6/1985 | Jida et al. | 354/416 |
| 4,985,725 | 1/1991 | Serikawa | 354/416 |

FOREIGN PATENT DOCUMENTS

| 44-03905 | 12/1969 | Japan . |
| 56-114937 | 9/1981 | Japan . |
| 64-17033 | 1/1989 | Japan . |
| 1-124838 | 5/1989 | Japan . |
| 56-159622 | 12/1989 | Japan . |

Primary Examiner—W. B. Perkey
Attorney, Agent, or Firm—Oblon, Spivak, McClelland, Maier & Neustadt

[57] ABSTRACT

A flashing apparatus of an automatic light-adjusting type for illuminating a photographed object by discharging a charge charged to a main capacitor from a light emitting tube has an energy amount detector for detecting an energy amount applied to the light emitting tube from the main capacitor; an energy amount setting device for setting an amount of discharged energy of the main capacitor corresponding to a quantity of light required to illuminate the photographed object; a comparator for comparing the energy amount detected by the energy amount detector with the energy amount set by the energy amount setting device; and a light emission stopping device for stopping light emission of the light emitting tube by a signal outputted from the comparator when the comparator detects that the discharged energy amount of the main capacitor is in conformity with the set amount of the energy amount setting device after the light emission is started. The flashing apparatus may further has a voltage detector constituting the energy amount detector and detecting a voltage applied to the light emitting tube from the main capacitor; an electric current detector for detecting an electric current flowing through the light emitting tube; a multiplying device for multiplying the detected voltage by the detected electric current; an integrator for integrating the multiplied results; etc.

17 Claims, 21 Drawing Sheets

FLASH CONTROL BASED ON CALCULATED REQUIRED FLASH ENERGY

BACKGROUND OF THE INVENTION

1. Field of the Invention

The present invention relates to a flashing apparatus of an automatic light-adjusting type for a camera generally called an auto-stroboscope.

2. Description of the Related Art

In a general flashing apparatus of this kind, light is emitted from a light emitting tube and light reflected from a photographed object is integrated. When the integrated light has reached a predetermined value, the light emission of the light emitting tube is stopped by flowing the charge of a main capacitor through a bypass line. Such a parallel control system is described in U.S. Pat. No. 3,033,988 patented in 1957. In a so-called series control system, when the light reflected from the photographed object is integrated and has reached a predetermined value, a switching element connected in series to the light emitting tube is turned off to stop the light emission thereof. This series control system is described in Japanese Patent Publication (KOKOKU) No. 44-30905.

Further, there is a known system for controlling a diaphragmof a camera by detecting the voltage of a main capacitor. Furthermore, there is a known system for controlling a guide number by changing a light emitting time. Such control systems are not used for an auto-stroboscope.

Recently, cameras using zoom lenses have rapidly spread so that the number of stroboscopes for illumination corresponding to the zoom lenses is increased. When a stroboscope using a zoom lens is used, a light emitting capacity is changed in accordance with a position of the zoom lens. Namely, when the same energy is discharged by a discharge tube to emit light therefrom, a guide number at a telescopic time is larger than that at a wide angle time. Therefore, it is necessary to change an amount of energy supplied to the discharge tube at the same distance from the camera to the photographed object in accordance with the wide angle and telescopic cases.

In the general stroboscope of the series control system, a known stroboscopic controller using an IGBT (Insulated Gate Bipolar Transistor) is disposed to simplify the structure of the stroboscope. In particular, the stroboscopic controller has advantages that it is not necessary to dispose a circuit for applying a backward bias voltage at a stopping time of the operation of the stroboscope in comparison with series control performed by a thyristor often used in the stroboscopic controller at the present time. Further, no flashover is caused in this stroboscopic controller.

When light is emitted from the stroboscope, a peak electric current of the stroboscope often ranges from 100 to 250 A in the case of a camera. This peak electric current depends on a voltage of the main capacitor and an impedance of a xenon lamp for discharge, etc. When this peak electric current flows through the stroboscope, it is necessary to apply a limited voltage about 30 to 40 V to a gate of the insulated gate bipolar transistor. In a certain kind of the insulated gate bipolar transistor, it is necessary to apply a limited voltage of about 15 to 25 V to a gate of the insulated gate bipolar transistor.

Accordingly, it is desirable that the voltage applied to the gate of the insulated gate bipolar transistor is constant in a range in which the peak electric current can flow through the insulated gate bipolar transistor.

Japanese Patent Application Laying Open (KOKAI) Nos. 64-17033 and 1-124838 show stroboscopes using the insulated gate bipolar transistor.

However, the stroboscope having a structure for receiving light reflected from the photographed object has the following problems.

(1) The light emission of the stroboscope is stopped by receiving the light reflected from the photographed object. Therefore, it is impossible to adjust a quantity of received light when the photographed object is too far from the stroboscope or too near the stroboscope.

(2) The amount of the received light is changed in accordance with the reflectivity of the photographed object so that exposure is changed. For example, exposure is excessively increased when a background of the photographed object has a low reflectivity. In contrast to this, exposure is excessively decreased when the background of the photographed object has a high reflectivity.

(3) An error in exposure is caused in a TTL direct system in accordance with a difference in reflectivity between film faces.

(4) It is necessary that a light-receiving element has a high sensitivity and a high responsive speed. Further, it is necessary to dispose many parts requiring high accuracy in operation such as a light quantity integrating circuit, an integrating capacitor, etc., thereby increasing the cost of the stroboscope and a space therefor.

The stroboscope for performing a control operation by changing a light emitting time has the following problems.

(1) The light emitting time of the stroboscope is short so that it is difficult to control the operation of the stroboscope with high accuracy.

(2) The quantity of light is greatly changed in accordance with the voltage of a main capacitor just before light is emitted from the stroboscope.

(3) It is difficult to control a guide number when the guide number is small at a small quantity of light.

In the camera using a general zoom stroboscope, it is necessary to change the diameter of a diaphragm in accordance with zooming information. Therefore, it is necessary to associate the operation of the stroboscope with the operation of a mechanical mechanism for operating the camera. Accordingly, the accuracy in control of the quantity of light cannot be easily improved and the mechanism is very complicated.

Further, in the general stroboscope, when no voltage about 30 to 40 V, or 15 to 25 V is applied to the gate of the insulated gate bipolar transistor so as to operate the insulated gate bipolar transistor, it is impossible to provide a predetermined quantity of emitted light and the insulated gate bipolar transistor is broken in a certain case.

In Japanese Patent Application Laying Open (KOKAI) Nos. 64-17033 and 1-124838 mentioned above, there is no concrete description about a system for stopping the light emission. For example, when a known circuit for integrating light reflected from the photographed object is used in the stroboscope, it is necessary to dispose many parts requiring high speed and accuracy in operation. Accordingly, it is impossible to greatly reduce the cost of the stroboscope and make constructional circuits thereof compact even when the insulated gate bipolar transistor is used in the stroboscope.

When a method for controlling the light emitting time is used, the constructional circuits of the stroboscope are made compact. However, in this case, a small quantity of light cannot be emitted from the stroboscope with high accuracy. Further, it is impossible to preferably perform a light emitting control operation in a wide range at a certain voltage of the main capacitor at the light emitting time of the stroboscope.

SUMMARY OF THE INVENTION

It is therefore an object of the present invention to provide a flashing apparatus of an automatic light-adjusting type which corresponds to a zoom strobscope without using a method using light reflected from a photographed object and which reliably operates an insulated gate bipolar transistor and has high accuracy and reduced cost and space.

In accordance with a first structure of the present invention, the above object can be achieved by a flashing apparatus of an automatic light-adjusting type for illuminating a photographed object by discharging a charge charged to a main capacitor from a light emitting tube, the flashing apparatus comprising energy amount detecting means for detecting an energy amount applied to the light emitting tube from the main capacitor; energy amount setting means for setting an amount of discharged energy of the main capacitor corresponding to a quantity of light required to illuminate the photographed object; comparing means for comparing the energy amount detected by the energy amount detecting means with the energy amount set by the energy amount setting means; and light emission stopping means for stopping light emission of the light emitting tube by a signal outputted from the comparing means when the comparing means detects that the discharged energy amount of the main capacitor is in conformity with the set amount of the energy amount setting means after the light emission is started.

In accordance with a second structure of the present invention, the detecting means in the first structure comprises voltage detecting means for detecting a voltage applied to the light emitting tube from the main capacitor; electric current detecting means for detecting an electric current flowing through the light emitting tube; multiplying means for multiplying the detected voltage by the detected electric current; integrating means for integrating the multiplied results; the setting means in the first structure comprises light quantity calculating means for calculating a quantity of light required to illuminate the photographed object based on photographing information such as information of a distance from a camera to the photographed object, sensitivity information of a film, and diaphragm information; and voltage-current integrated value calculating means for calculating an integrated value of a product of an electric current and a voltage applied to the light emitting tube and corresponding to the calculated quantity of light; and the comparing means comprises means for comparing an output of the integrating means with an output of the voltage-current integrated value calculating means and outputting the signal when both outputs are in conformity with each other.

In accordance with a third structure of the present invention, the detecting means in the first structure comprises voltage detecting means for detecting a first voltage of the main capacitor charged before discharge and a second voltage of the main capacitor reduced at a discharging time thereof, the voltage detecting means converting the first and second voltages to digital signals; the setting means in the first structure comprises voltage calculating means for receiving the digital signal indicative of the first voltage and calculating a third voltage of the main capacitor based on photographing information such as basic guide number information and others after energy corresponding to the quantity of light required to illuminate the photographed object is discharged from the main capacitor, the voltage calculating means outputting a digital signal indicative of the third voltage; and the comparing means comprises means for comparing the digital signal indicative of the third voltage outputted from the voltage calculating means with the digital signal indicative of the second voltage reduced after a discharging operation of the main capacitor is started, the comparing means outputting the signal for stopping light emission of the light emitting tube when the digital signals indicative of the second and third voltages are in conformity with each other.

In accordance with a fourth structure of the present invention, the detecting means in the first structure comprises an analog/digital converter for detecting and converting a voltage proportional to a first voltage of the main capacitor charged before discharge to a digital signal; the setting means in the first structure comprises light quantity calculating means for calculating a quantity of light required to illuminate the photographed object based on photographing information such as ISO information of a film, diaphragm information of a camera, and information of a distance from the camera to the photographed object; voltage calculating means for calculating a third voltage of the main capacitor based on basic guide number information and the digital signal indicative of the voltage proportional to the first voltage after energy corresponding to the quantity of light required to illuminate the photographed object is discharged from the main capacitor; and a digital/analog converter for converting a digital signal indicative of a voltage proportional to the calculated third voltage to an analog signal; and the comparing means comprises means for comparing the voltage proportional to the third voltage outputted from the digital/analog converter with a voltage proportional to a second voltage of the main capacitor reduced after a discharging operation of the main capacitor is started, the comparing means outputting the signal for stopping light emission of the light emitting tube when the voltage proportional to the second and third voltages are in conformity with each other.

In accordance with a fifth structure of the present invention, the voltage calculating means in the third and fourth structures calculates the third voltage of the main capacitor based on a digital signal indicative of a voltage proportional to the first voltage, the basic guide number information and stroboscopic zoom information.

In accordance with a sixth structure of the present invention, the voltage calculating means in the third and fourth structures has means for correcting the third voltage in a region in which the quantity of light required to illuminate the photographed object is small.

In accordance with a seventh structure of the present invention, the correcting means in the sixth structure corrects the third voltage in accordance with the first voltage of the main capacitor.

In accordance with an eighth structure of the present invention, a circuit for providing voltages proportional to the first and second voltages of the main capacitor in the third and fourth structures is constructed by a resistor voltage-dividing circuit connected in series to switching means which is turned on to provide the voltages proportional to the first and second voltages only when necessary.

In accordance with a ninth structure of the present invention, the stopping means in the third and fourth structures comprises an insulated gate bipolar transistor disposed within a discharging loop of the main capacitor through the light emitting tube, a control circuit for applying a constant voltage to a gate of the insulated gate bipolar transistor, and a second capacitor for holding and supplying the constant voltage, and the insulated gate bipolar transistor is turned off through the control circuit when the second voltage is reduced and is less than the third voltage.

In accordance with a tenth structure of the present invention, the flashing apparatus in the ninth structure further comprises first detecting means for detecting a level of the charged voltage of the main capacitor, second detecting means for detecting a level of a charged voltage of the second capacitor, and control means for controlling charging operations of the main and second capacitors by outputs of the first and second detecting means.

In accordance with an eleventh structure of the present invention, the comparing means in the tenth structure outputs a signal for allowing the light emission when voltages of the outputs of the first and second detecting means are greater than predetermined values.

In the above first structure of the present invention, after the light emission is started, the comparing means detects that the discharged energy amount of the main capacitor is in conformity with the set value of the energy amount setting means. The light emission stopping means stops the light emission of the light emitting tube by a signal outputted from the comparing means when the discharged energy amount is in conformity with the set value.

In the second structure of the present invention, the discharged energy amount in the first structure is calculated from an integrated value of a product of a voltage applied to the light emitting tube and an electric current flowing therethrough.

In the third structure of the present invention, the third voltage of the main capacitor after the discharge of a desirable amount of energy required to illuminate the photographed object is calculated in advance by using information such as the first voltage of the main capacitor before discharge, a basic guide number of a stroboscope, the sensitivity of a used film, the distance from a camera to the photographed object, a diaphragm value, etc. The calculated third voltage is compared with the second voltage of the main capacitor reduced by the discharging operation thereof to control the light emission of the light emitting tube.

In the fourth structure of the present invention, the first to third voltages in the third structure are suitably converted to digital or analog signals by an analog/digital converter or a digital/analog converter. Accordingly, it is possible to perform calculating and comparing operations of the flashing apparatus accurately and reliably.

In the fifth structure of the present invention, the third voltage of the main capacitor after the discharge of a desirable amount of energy required to illuminate the photographed object is calculated in advance by using information such as the first voltage of the main capacitor before discharge, a basic guide number of a stroboscope, the sensitivity of a used film, the distance from a camera to the photographed object, a diaphragm value, etc. The calculated third voltage is compared with the second voltage of the main capacitor reduced by the discharging operation thereof to control the light emission of the light emitting tube.

In the sixth and seventh structures of the present invention, the third voltage corrected with respect to a returning amount of the voltage of the main capacitor after the stoppage of the light emission is calculated. A voltage proportional to this corrected third voltage is inputted to the comparing means. Accordingly, it is possible to perform a control operation of the flashing apparatus with high accuracy in an entire region from a small guide number to a large guide number.

In the eighth structure of the present invention, the switching means is turned on only when necessary to output the first and second voltages. The switching means is turned off when unnecessary so that it is possible to prevent the main capacitor from being discharged.

In the ninth structure of the present invention, the insulated gate bipolar transistor is reliably turned off through the control circuit when the second voltage is reduced and is less than the third voltage. Accordingly, it is possible to reliably perform a control operation of the flashing apparatus with high accuracy in a region from a small guide number to a large guide number.

In the tenth structure of the present invention, the first and second detecting means respectively detect voltage levels of the main capacitor and the second capacitor for holding and supplying a constant voltage to a gate of the insulated gate bipolar transistor. The control means controls charging operations of the main and second capacitors. Accordingly, it is possible to reliably emit light at any time and prevent the insulated gate bipolar transistor from being broken.

In the eleventh structure of the present invention, the comparing means outputs a signal for allowing the light emission when the voltages of outputs of the first and second detecting means in the tenth structure are greater than predetermined values. Accordingly, it is possible to reliably emit light and prevent the insulated gate bipolar transistor from being broken.

Further objects and advantages of the present invention will be apparent from the following description of the preferred embodiments of the present invention as illustrated in the accompanying drawings.

DESCRIPTION OF THE PREFERRED EMBODIMENTS

The preferred embodiment of a flashing apparatus of an automatic light-adjusting type in the present invention will next be described in detail with reference to the accompanying drawings.

Figure 1:
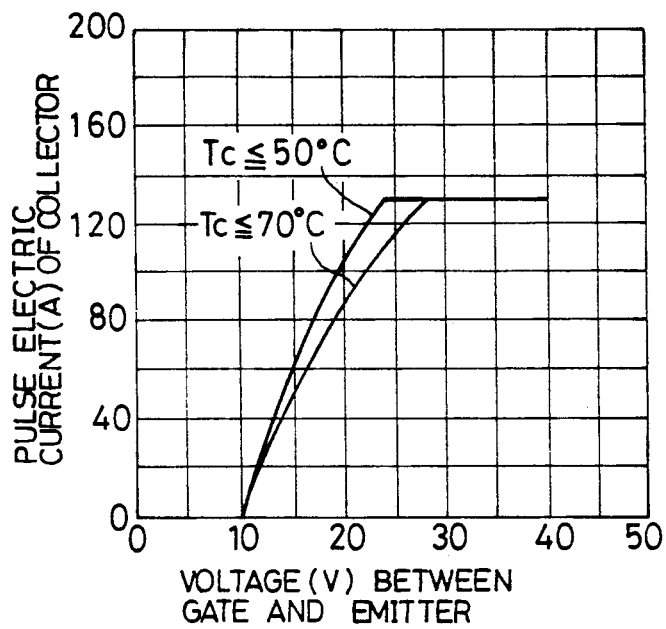
FIG. 1 is a characteristic graph showing the relation between a voltage between a gate and an emitter of an insulated gate bipolar transistor and a collector electric current thereof.

When light is emitted from a stroboscope, a peak electric current of the stroboscope often ranges from 100 to 250 A in the case of a camera. This peak electric current depends on the voltage of a main capacitor and an impedance of a xenon lamp for discharge, etc. As shown in FIG. 1, when this peak electric current flows through the stroboscope, it is necessary to apply a limited voltage of about 30 to 40 V to a gate of an insulated gate bipolar transistor. In a certain kind of an insulated gate bipolar transistor, it is necessary to apply a limited voltage of about 15 to 25 V to the gate of the insulated gate bipolar transistor.

Accordingly, it is desirable that the voltage applied to the gate of the insulated gate bipolar transistor is constant in a range in which the peak electric current can flow through the insulated gate bipolar transistor.

Figure 2:
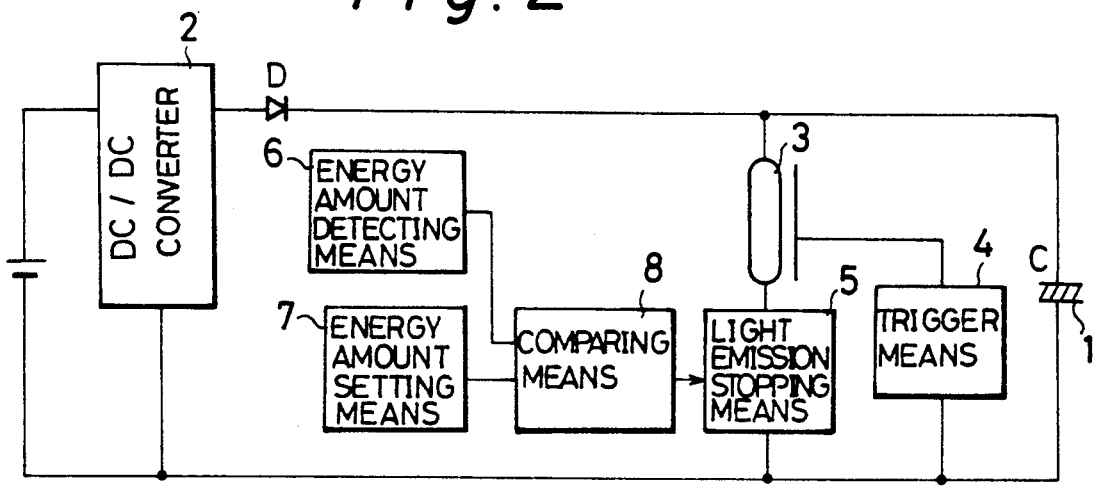
FIG. 2 is a view showing the construction of a flashing apparatus of an automatic light-adjusting type in a first embodiment of the present invention.

FIG. 2 shows the construction of a flashing apparatus of an automatic light-adjusting type of a first embodiment of the present invention. In FIG. 1, a main capacitor 1 has a capacity C and a DC/DC converter 2 increases the voltage of a battery to charge the main capacitor 1. Light is emitted from a light emitting tube 3 by a trigger means 4 when necessary. A light emission stopping means 5 is connected in series to the light emitting tube 3 and is constructed by e.g., a switching element. The DC/DC converter 2, the trigger means 4, the light emission stopping means 5, etc. can be constructed by known devices. An energy amount detecting means 6 detects an amount of energy supplied to the light emitting tube 3 from the main capacitor 1. An energy amount setting means 7 sets an amount of discharged energy of the main capacitor 1 with respect to a quantity of light required to illuminate a photographed object. A comparing means 8 compares outputs of the energy amount detecting means 6 and the energy amount setting means 7 with each other.

In FIG. 2, the battery voltage is increased by the DC/DC converter 2 and is applied to the main capacitor 1 to charge the main capacitor 1. When a trigger voltage is applied to the light emitting tube 3 by the trigger means 4, an electric current flows through the light emitting tube 3 from the main capacitor 1 so that light is emitted from the light emitting tube 3. The amount of energy supplied to the light emitting tube 3 from the main capacitor 1 is detected by the energy amount detecting means 6. The amount of discharged energy of the main capacitor 1 corresponding to the quantity of light required to illuminate the photographed body is set in the energy amount setting means 7. When the amount of discharged energy of the main capacitor 1 is in conformity with a set value of the energy amount setting means 7, the comparing means 8 outputs a signal indicative of this conformity to the light emission stopping means 5. Thus, the light emission stopping means 5 is operated to stop the light emission of the light emitting tube 3.

Figure 3:
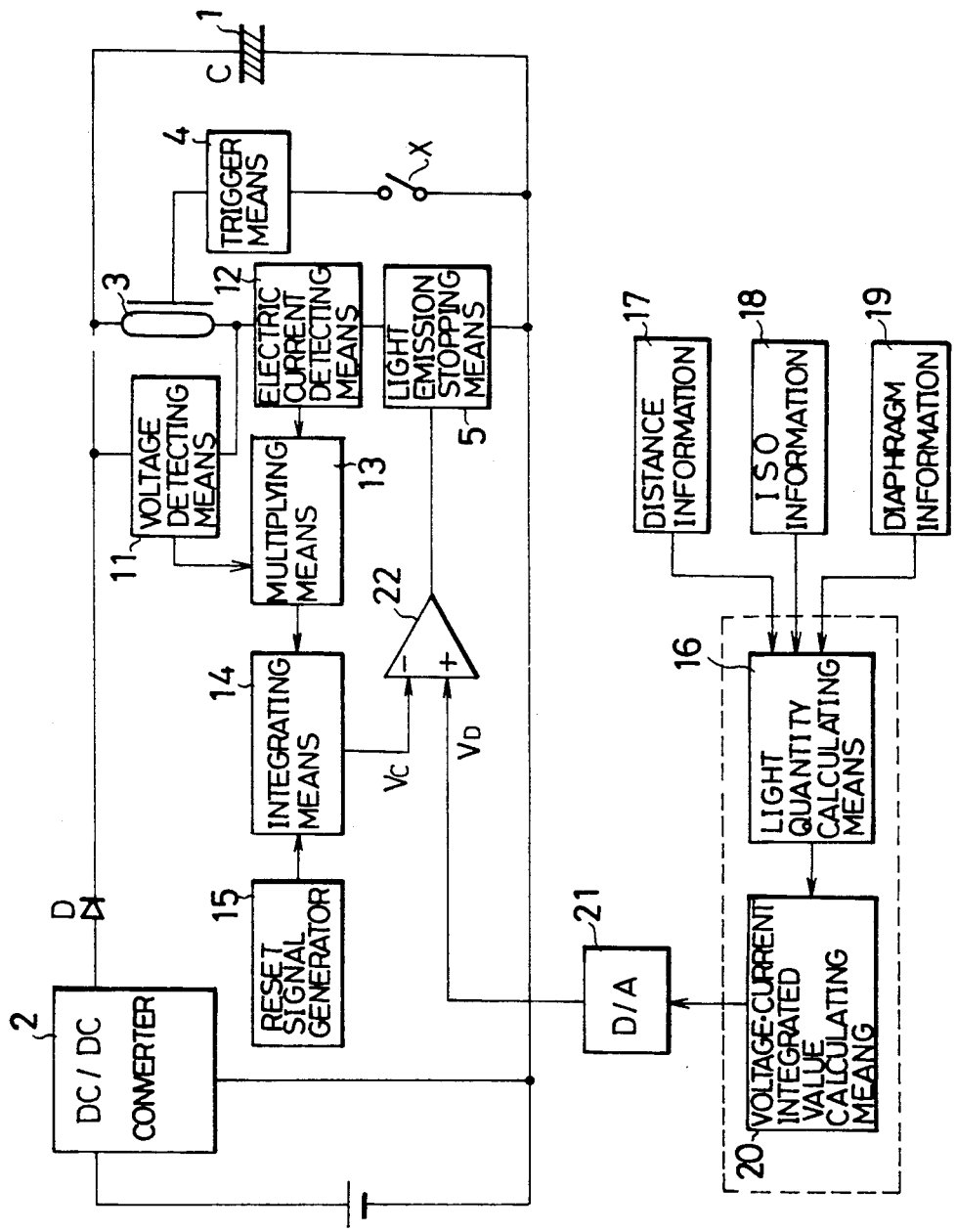
FIG. 3 is a view showing the construction of a flashing apparatus of an automatic light-adjusting type in a second embodiment of the present invention.

FIG. 3 shows the construction of a flashing apparatus of an automatic light-adjusting type in a second embodiment of the present invention. In FIG. 3, constructional members corresponding to those in FIG. 2 are designated by the same reference numerals as those in FIG. 2. A voltage detecting means 11 detects a voltage applied to a light emitting tube 3 from a main capacitor 1. An electric current detecting means 12 detects an electric current flowing through the light emitting tube 3. A multiplying means 13 multiplies the detected voltage by the detected electric current. An integrating means 14 integrates the multiplied results. A reset signal generator 15 generates a signal for resetting the integrating means 14. A light quantity calculating means 16 calculates a quantity of light required to illuminate a photographed object based on photographing information such as information of a distance from a camera to the photographed object, ISO information of a film, diaphragm information, etc. Sections of the distance information, the ISO information and the diaphragm information are respectively designated by reference numerals 17, 18 and 19. A voltage-current integrated value calculating means 20 calculates an integrated value of a product of an electric current and a voltage corresponding to the required quantity of light and applied to the light emitting tube 3. A D/A converter (digital/analog converter) 21 converts the calculated results of the voltage-current integrated value calculating means 20 to an analog signal. A comparing means 22 compares an output $V_C$ of the integrating means 14 with an output $V_D$ of the D/A converter 21. When these outputs are in conformity with each other, an output of the comparing means 22 is inverted. The operation of the light emission stopping means 5 is controlled by the output of the comparing means 22.

In FIG. 3, the quantity of light required to illuminate the photographed object is calculated by the light quantity calculating means 16 based on the photographing information such as the distance information of section 17, the ISO information of a film of section 18, the diaphragm information of section 19, etc. The integrated value of a product of an electric current and a voltage corresponding to this quantity of light and applied to the light emitting tube 3 is calculated by the voltage-current integrated value calculating means 20 in advance. The calculated results of the voltage-current integrated value calculating means 20 are inputted as output $V_D$ to a plus terminal of the comparing means 22 through the D/A converter 21.

When the integrating means 14 is next reset and a contact X is closed, the trigger means 4 is operated and an electric current flows through the light emitting tube 3 to start light emission. A reset state of the integrating means 14 is approximately released simultaneously. The voltage applied to the light emitting tube 3 is detected by the voltage detecting means 11. The electric current flowing through the light emitting tube 3 is detected by the electric current detecting means 12. The detected voltage and electric current are multiplied and integrated to calculate an amount of discharged energy consumed in the light emitting tube 3. The output signal $V_C$ corresponding to the amount of discharged energy is then inputted to a minus terminal of the comparing means 22 to compare this output $V_C$ with the output $V_D$. When a voltage of the output $V_C$ exceeds that of the output $V_D$, an output of the comparing means 22 is inverted. Thus, the light emission stopping means 5 such as a switching element composed of an insulated gate bipolar transistor is operated (is opened in the case of the switching element) by the inversion of the output of the comparing means, thereby stopping the light emission of the light emitting tube 3.

A calculating system for setting the voltage of the output $V_C$ will next be described.

(1) A quantity value L of the emitted light is proportional to a product of a discharged electric current i and an applied voltage V.

$$L \propto i \cdot V \tag{1}$$

(2) An integrated value of the quantity value L of the emitted light is proportional to (guide number)$^2$.

$$\int L dt' \propto G \text{ No.}^2 \tag{2}$$

(3) An integrated value of the product of the discharged electric current i and the applied voltage V is therefore proportional to (guide number)$^2$.

$$\int i \cdot V dt \propto G \text{ No.}^2 \tag{3}$$

Figure 4:
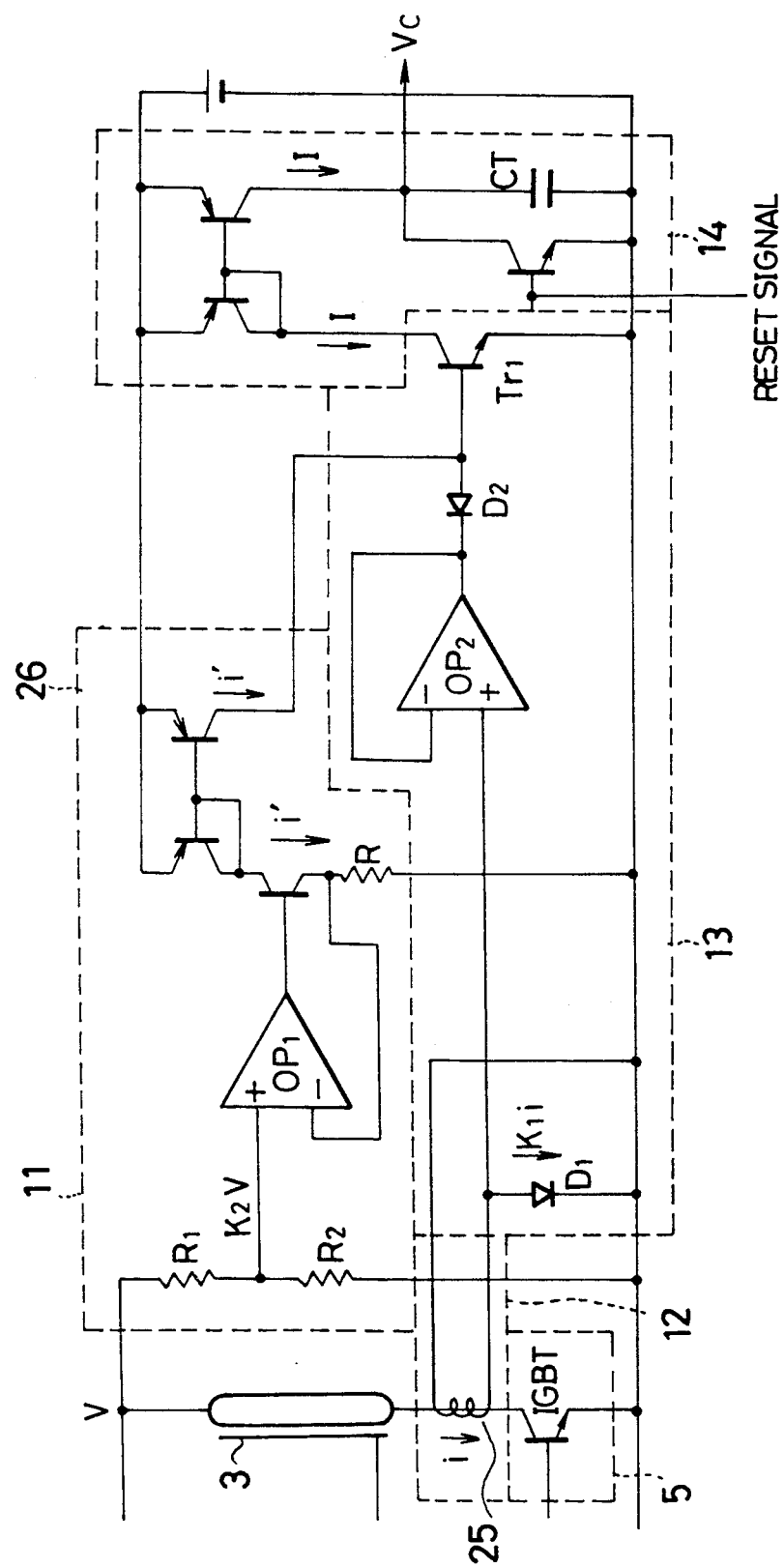
FIG. 4 is a circuit diagram showing the concrete construction of a main portion in the flashing apparatus of an automatic light-adjusting type in the second embodiment of the present invention.

(4) It is impossible to integrate the product of the discharged electric current i and the applied voltage V as it is. Therefore, the discharged electric current i is measured as a value $k_1 i$ by e.g., an electric current detecting coil 25 constituting a concrete circuit in the flashing apparatus of an automatic light-adjusting type in the second embodiment of the present invention as shown in FIG. 4. The voltage V is measured as a value $k_2 V$. The coefficients $k_1$ and $k_2$ are proportional constants. A product of these values $k_1 i$ and $k_2 V$ is integrated.

$$\int k_1 i \cdot k_2 V dt \propto G \text{ No.}^2 \tag{4}$$

(5) This product is converted to an electric current I and is integrated by a capacitor $C_T$. Thus, an integrated output $V_C$ is provided as follows.

$$V_c = \frac{1}{C_T} \int I dt \tag{5}$$

In this case, $I = k_1 i \cdot k_2 V$.
Further, the following relation (6) is formed.

$$\frac{1}{C_T} \int' I dt \propto G \text{ No.}^2 \tag{6}$$

Accordingly, from the above formulas (5) and (6), the integrated output $V_C$ is provided as follows.

$$V_c = KG \text{ No.}^2 \tag{7}$$

In the above formula (7), K is a proportional constant.

The capacity of the capacitor $C_T$ can be suitably set to easily provide the integrated output $V_C$ in a constructional circuit.

The concrete circuit shown in FIG. 4 will next be described in detail.

In the electric current detecting means 12, the electric current i flowing through the light emitting tube 3 is provided as the value $k_1 i$ by the electric current detecting coil 25. When this electric current flows through a diode $D_1$, a voltage represented by the following formula (8) is generated.

$$\frac{kT}{q} \ln \frac{k_1 i}{I_s} \tag{8}$$

In this formula (8), reference numerals k, q, T and $I_S$ respectively designate a Boltzmann's constant, an electric charge, an absolute temperature and a backward saturation electric current.

The voltage detecting means 11 partially divides the voltage V by resistors $R_1$ and $R_2$ so that this voltage V is outputted as $VR_2/(R_1+R_2) = k_2 V$. This voltage is converted to an electric current $i'$ by a resistor R and an operational amplifier $OP_1$ and this electric current flows through a diode $D_2$ by a mirror circuit 26. A voltage represented by the following formula (9) is generated in the diode $D_2$.

$$\frac{kT}{q} \ln \frac{k_2 V/R}{I_s} \qquad (9)$$

Voltages of the diodes $D_1$ and $D_2$ are added to each other by an operational amplifier $OP_2$ and this added voltage is converted to an electric current I for integration by a transistor $Tr_1$. This electric current I is calculated by the following formula (10).

$$\frac{kT}{q} \ln \frac{k_1 i}{I_s} + \frac{kT}{q} \ln \frac{k_2 V/R}{I_s} = \frac{kT}{q} \ln \frac{I}{I_s} \qquad (10)$$

The right-hand side of the above formula (10) shows a voltage $V_{BE}$ (between a base and an emitter) of the transistor $Tr_1$. The electric current I is thus calculated from the above formula (10) as follows.

$$\frac{kT}{q} \ln \left( \frac{k_1 i \times k_2 V/R}{I_s^2} \right) = \frac{kT}{q} \ln \frac{I}{I_s} \qquad (11)$$

$$\frac{I}{I_s} = \frac{k_1 i \times k_2 V/R}{I_s^2}$$

$$\therefore I = \frac{k_1 i \times k_2 V/R}{I_s} = \frac{k_1 i \times k_2 V}{R I_s}$$

When $k_1 k_2/R I_S$ is set to a proportional constant $K_1$, $I = K_1(V \times i)$ is obtained.

When the voltage of a reset signal is changed from a high voltage to a low voltage, a turning-on state of the above transistor is switched to a turning-off state. In this case, the voltage of the output $V_C$ is provided as follows.

$$V_c = \frac{1}{C_T} \int I dt = \frac{K_1}{C_T} \int (V \cdot i) dt \qquad (12)$$

Thus, the voltage of the output $V_C$ is calculated from the above formula (12).

Thus, after the light emission of the light emitting tube 3, the reset state of the integrating means 14 is released and a product of the electric current i and the voltage V is integrated and can be outputted as the output $V_C$.

Figure 5:
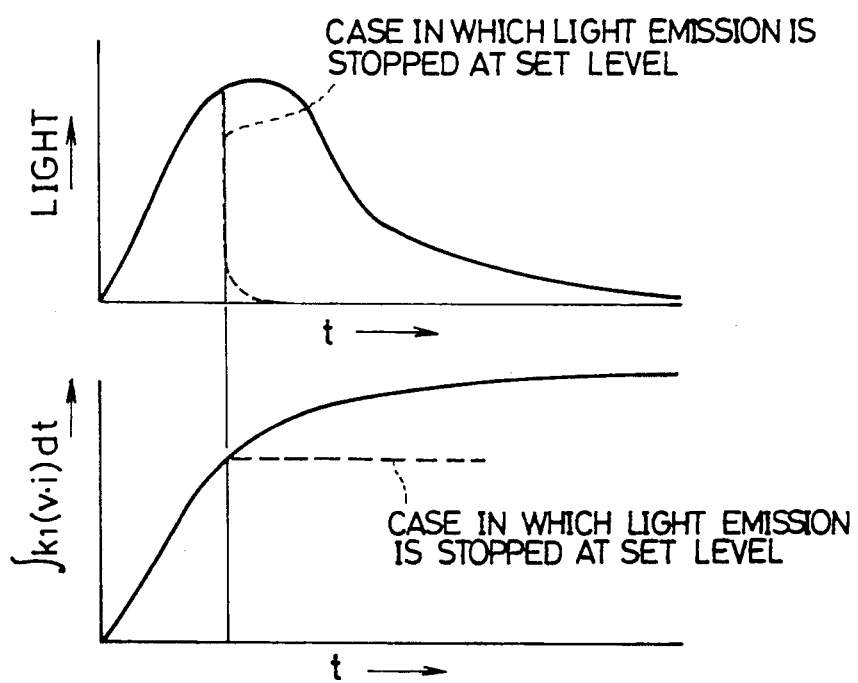
FIG. 5 is a graph showing the relation between a waveform of emitted light and an integrated output.

FIG. 5 shows the relation between a waveform of the emitted light and the integrated output.

In the above embodiments, the amount of energy corresponding to the quantity of light required to perform a photographing operation is calculated in advance. The amount of discharged energy at the light emitting time, i.e., the integrated value of a product of discharged electric current and voltage, is compared with the amount of energy calculated in advance. When the integrated value has reached the amount of energy calculated in advance, the light emission of the light emitting tube is stopped. Therefore, there is no influence of reflectivities of the photographed object and a film on the operation of the flashing apparatus and it is not necessary to dispose a photometric circuit. Accordingly, it is possible to control the quantity of light with high accuracy and the number of parts is greatly reduced so that the cost of the flashing apparatus and a space therefor can be reduced.

Further, the required quantity of light is calculated from film sensitivity information, information of a distance from a camera to the photographed object and diaphragm information before the light emission. Therefore, it is possible to judge whether the quantity of light can be adjusted or not before the light emission. When the distance from the camera to the photographed object is long and the quantity of light is insufficient at the present value of a diaphragm, the diaphragm can be further opened to reduce the required quantity of light. Further, when the quantity of light is insufficient in an open state of the diaphragm, it is possible to give a warning and display how much the quantity of light is insufficient before the photographing operation. When the photographed object is near the camera, it is possible to easily cope with this situation by correcting only a comparing voltage of the integrated value in consideration of stopping characteristics of the operation of a stroboscope.

In the above-mentioned embodiments, many of the constructional circuits can be easily integrated with each other and can be built-in a one-chip microcomputer so that the cost of the flashing apparatus and the space therefor are not almost increased. Further, a general camera has means for providing information such as the film sensitivity, the diaphragm, the distance from the camera to the photographed object, etc. so that it is not necessary to newly add such means to the general camera.

Furthermore, the integrated value of a product of discharged electric current and voltage corresponding to light energy is compared with the amount of energy calculated in advance so that there is no influence of electrical characteristics of circuit elements and wiring on the operation of the flashing apparatus.

Figure 6:
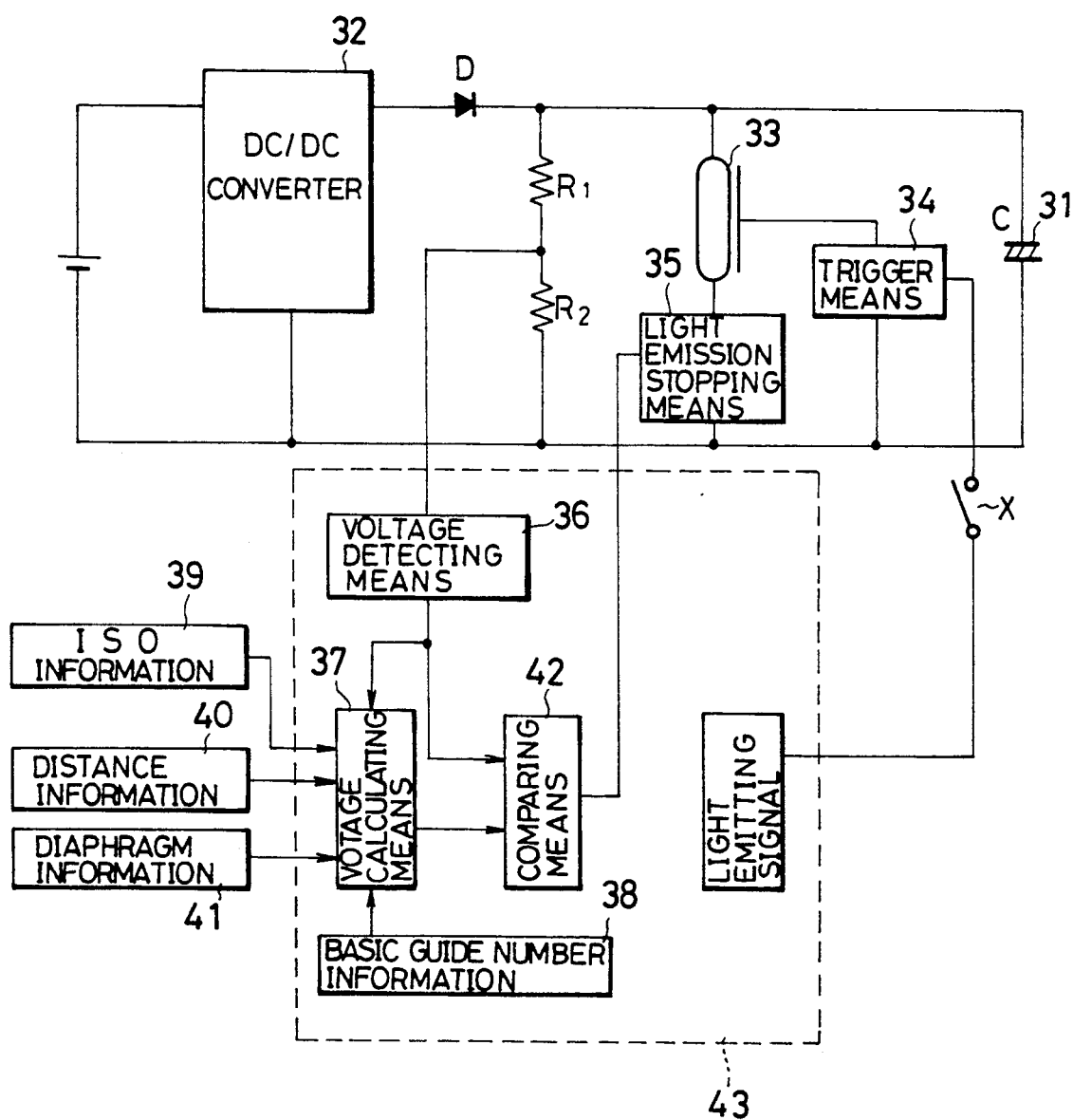
FIG. 6 is a view showing the construction of a flashing apparatus of an automatic light-adjusting type in a third embodiment of the present invention.

FIG. 6 shows the construction of a flashing apparatus of an automatic light-adjusting type of a third embodiment of the present invention.

In FIG. 6, a main capacitor 31 has a capacity C and a DC/DC converter 32 increases the voltage of a battery to charge the main capacitor 31. Light is emitted from a light emitting tube (a flashing discharge tube) 33 by a trigger means 34 based on a light emitting signal outputted thereto when necessary. A light emission stopping means 35 is connected in series to the light emitting tube 33 and is constructed by e.g., a switching element. A voltage detecting means 36 detects a first voltage of the charged main capacitor 31 before discharge. The voltage detecting means 36 also detects a second voltage of the main capacitor 31 reduced at a discharging time thereof. The voltage detecting means 36 converts the detected first and second voltages to digital signals. The voltage detecting means 36 is constructed by e.g., an A/D converter.

A voltage calculating means 37 receives the digital signal indicative of the first voltage detected by the voltage detecting means 36. The voltage calculating means 37 calculates a third voltage of the main capacitor 31 at a stopping time of light emission after energy corresponding to a desirable quantity of light required to illuminate a photographed object is discharged from the main capacitor. The third voltage of the main capacitor 31 is calculated by the voltage calculating means 37 based on photographing information such as basic guide number information, sensitivity information of a used film, information of a distance from a camera to the photographed object, diaphragm information of the camera, etc. Sections of the basic guide number information, the sensitivity information, the distance information and the diaphragm information are respectively designated by reference numerals 38, 39, 40 and 41. The voltage calculating means 37 outputs a digital signal indicative of the calculated third voltage.

A comparing means 42 compares the digital signal indicative of the third voltage outputted from the voltage calculating means 37 with the digital signal indicative of the second voltage reduced after a discharging operation is started. When the digital signals indicative of the second and third voltages are in conformity with each other, the comparing means 42 outputs a signal for stopping the light emission. The voltage detecting means 36, the voltage calculating means 37, the comparing means 42 and a section for outputting the light emitting signal for operating the trigger means 34 are disposed together with each other within a central processing unit (CPU) 43. A basic guide number in a stroboscope is also stored into this central processing unit 43 in advance.

The operation of the flashing apparatus of an automatic light-adjusting type in the third embodiment will next be described briefly.

The voltage of a battery is increased by the DC/DC converter 32 and is applied to the main capacitor 31 to charge the main capacitor 31. A voltage of the main capacitor 31 is partially divided by resistors $R_1$ and $R_2$ and is detected by the voltage detecting means 36 as the first voltage before discharge. A digital signal indicative of the first voltage is inputted to the voltage calculating means 37. The voltage calculating means 37 calculates the third voltage of the main capacitor 31 based on required photographing information of the guide number and others when the energy corresponding to the desirable quantity of light required to illuminate the photographed object is discharged from the main capacitor. The calculated results of the voltage calculating means 37 are set as one input signal of the comparing means 42. The photographed object may be illuminated by correcting exposure in accordance with the liking of a photographer.

When a trigger voltage is applied to the light emitting tube 33 by the trigger means 34, an electric current flows through the light emitting tube 33 from the main capacitor 31, thereby emitting light from the light emitting tube 33. The second voltage of the main capacitor 31 is reduced in accordance with the light emission of the light emitting tube 33. This changing second voltage is detected by the voltage detecting means 36 and a digital signal indicative of the second voltage is set to the other input signal of the comparing means 42. The comparing means 42 compares voltages of the input signals with each other. When the second voltage is in conformity with the third voltage, the comparing means 42 outputs a signal for stopping the light emission to the light emission stopping means 35. Thus, the light emission stopping means 35 is operated to stop the light emission of the light emitting tube 33.

A calculating method for setting the third voltage will next be described in detail with reference to FIG. 7.

The voltage of the main capacitor 31 at a full charging time thereof is set to $V_{HO}$. A remaining voltage of the main capacitor 31 after the completion of a full discharging operation of the light emitting tube 33 is set to $V_{TO}$. Reference numeral $GNo._o$ designates a guide number indicative of a quantity of the fully discharged light when the discharging operation of the light emitting tube 33 is started at voltage $V_{HO}$ and is stopped at voltage $V_{TO}$. Reference numeral D designates a distance from the camera to the photographed object.

Reference numeral F designates a diaphragm value of a lens. Reference numeral $GNo._X$ designates a guide number indicative of a quantity of the discharged light required to perform a photographing operation. In this case, the following formula (13) is formed.

$$G No._X = D \cdot F \tag{13}$$

If the same quantity of light is provided by stroboscopic light in a unit area, energy E emitted from the light emitting tube has the following relation (14).

$$E \propto D^2 \tag{14}$$

Further, the following relation (15) is formed.

$$D \propto G No. \tag{15}$$

Accordingly, the following relation (16) is obtained.

$$E \propto G No.^2 \tag{16}$$

Reference numeral $E_o$ designates energy emitted from voltage $V_{HO}$ to voltage $V_{TO}$. In this case, the following formula (17) is obtained.

$$E_o = \tfrac{1}{2}C(V_{HO}^2 - V_{TO}^2) = k \cdot G No._o^2 \tag{17}$$

In the above formula (17), reference numeral k is a proportional constant.

Further, in the following description, reference numeral $V_{HX}$ designates an arbitrary first voltage of the main capacitor 31 before the discharging operation is started. Reference numeral $V_{TX}$ designates a voltage of the main capacitor 31 when the discharging operation is stopped, i.e., when the second voltage is in conformity with the third voltage. At this time, obtained energy $E_X$ is represented by the following formula (18).

$$E_X = \tfrac{1}{2}C(V_{HX}^2 - V_{TX}^2) = k \cdot G No._X^2 \tag{18}$$

In this formula (18), $GNo._X$ is a guide number for obtaining the quantity of light required to perform the photographing operation.

When a ratio of $GNo._X$ as a required guide number to $GNo._o$ as a basic or reference guide number is set to x, the following formulas (19) and (20) are obtained.

$$x = \frac{G No._X}{G No._o} \tag{19}$$

$$x^2 = \frac{G No._X^2}{G No._o^2} = \frac{E_X}{E_o} = \frac{V_{HX}^2 - V_{TX}^2}{V_{HO}^2 - V_{TO}^2} \tag{20}$$

The voltage $V_{TX}$ for stopping the discharging operation is obtained from the above formula (20) as follows.

$$V_{TX}^2 = V_{HX}^2 - X^2(V_{HO}^2 - V_{TO}^2) \tag{21}$$

The following formula (22) is obtained by using the formula (19).

$$V_{TX}^2 = V_{HX}^2 - \frac{G No._X^2}{G No._o^2}(V_{HO}^2 - V_{TO}^2) \tag{22}$$

Voltage $V_D$ is outputted as a digital value by reducing voltage $V_{TX}$ calculated by the formula (21) or (22) at the same ratio as a partial voltage ratio determined by resistance values $R_1$ and $R_2$. Namely, the voltage $V_D$ is represented by the following formula (23).

$$V_D = \frac{R_2}{R_1 + R_2} \times V_{TX} \tag{23}$$

When $V_{TO}$ is set to be equal to $yV_{HO}$ so as to simplify the above formula (21), the following formula (24) is obtained.

$$V_{TX}^2 = V_{HX}^2 - X^2(1-y^2)V_{HO}^2 \tag{24}$$

$V_{TO}$ is a remaining voltage of the main capacitor 31 at the full discharging time thereof. $V_{HO}$ is a voltage of the main capacitor 31 at the full charging time thereof. For example, when $V_{TO}=40$ V and $V_{HO}=330$ V, $y=40/330 \approx 0.12$ is obtained. Accordingly, when $(1-y^2) \approx 1$, the formula (24) is changed to the following formula (25).

$$V_{TX}^2 = V_{HX}^2 - X^2 V_{HO}^2 \tag{25}$$

Further, when the operation of the flashing apparatus is controlled such that $V_{HX}$ is $V_{HO}$ at any time in the discharging operation, the following formula (26) is obtained.

$$V_{TX}^2 = (1-X^2)V_{HO}^2 \tag{26}$$

In the above calculation, $V_{HO}$ is the voltage of the main capacitor 31 at the full charging time thereof. However, this voltage $V_{HO}$ is not limited to the voltage of the main capacitor at the full charging time thereof. The voltage $V_{HO}$ may be an arbitrary value if this voltage is a dischargeable voltage. Namely, the voltage $V_{HO}$ may be a voltage corresponding to a known guide number. The above-mentioned calculating formulas can be used as they are even when the voltage $V_{HO}$ is a voltage corresponding to the known guide number. Similar effects are also obtained in the case of voltage $V_{TO}$.

In accordance with the third embodiment of the present invention, when the quantity of light required to perform the photographing operation is obtained from the voltage of the main capacitor 31 just before the discharging operation, it is necessary to calculate a voltage value of the main capacitor reduced and allowed to discharge the main capacitor. When the voltage of the main capacitor is reduced to this calculated voltage, the discharging operation of the light emitting tube is stopped. Accordingly, there is no influence of reflectivities of the photographed object and a film on the operation of the flashing apparatus and it is not necessary to dispose a photometric circuit. Therefore, it is possible to control the quantity of light with high accuracy and greatly reduce the number of parts so that the cost of the flashing apparatus and a space therefor can be reduced. Thus, operations and effects similar to those in the first and second embodiments can be obtained in the third embodiment.

Figure 8:
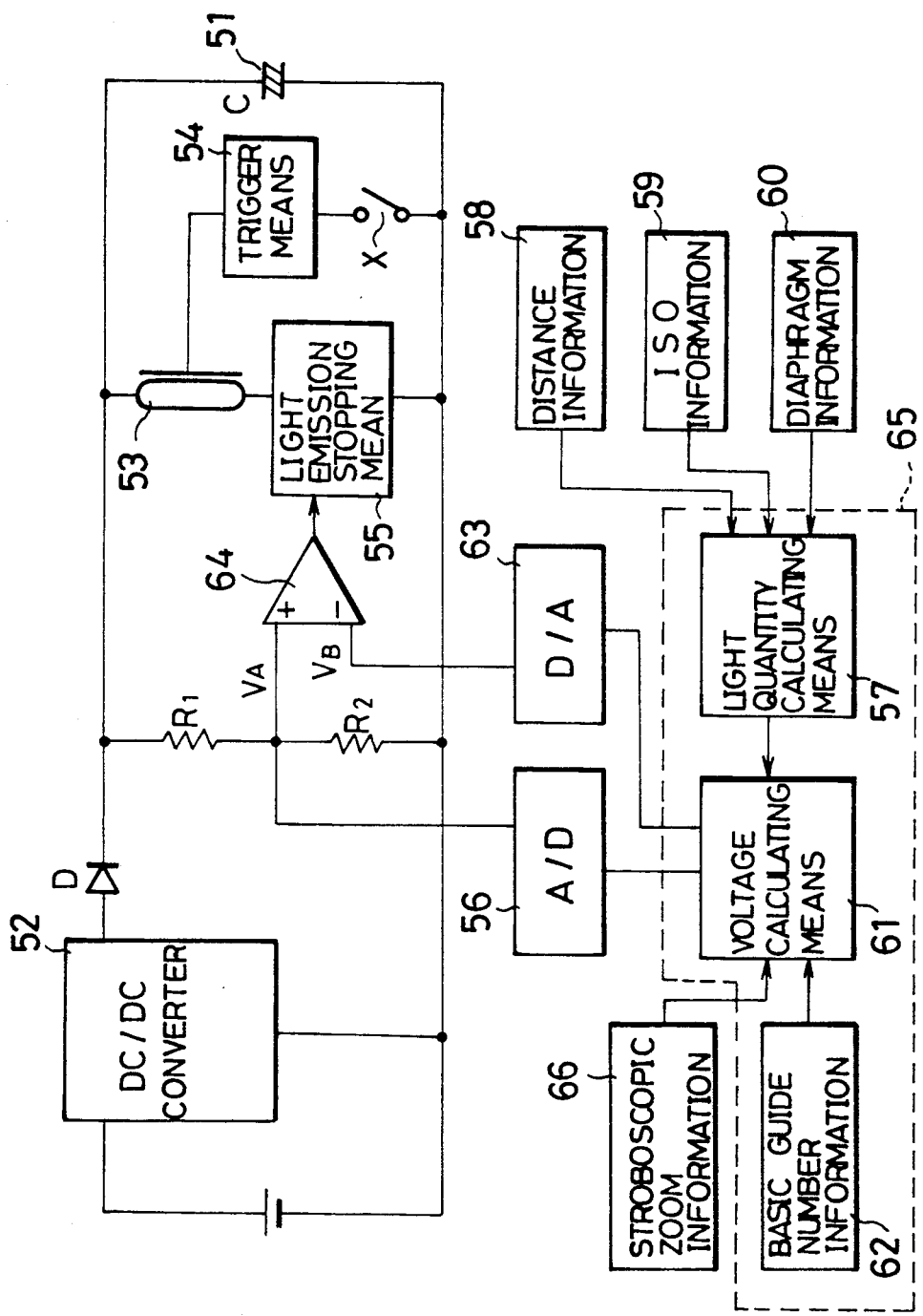
FIG. 8 is a view showing the construction of a flashing apparatus of an automatic light-adjusting type in a fourth embodiment of the present invention.

FIG. 8 shows the construction of a flashing apparatus of an automatic light-adjusting type of a fourth embodiment of the present invention. In FIG. 8, a main capacitor 51 has a capacity C and a DC/DC converter 52 increases the voltage of a battery to charge the main capacitor 51. Light is emitted from a light emitting tube 53 such as a xenon lamp by a trigger means 54 operated by closing a contact X. A light emission stopping means 55 is connected in series to the light emitting tube 53 and is constructed by e.g., a switching element. An analog/digital converter (A/D converter) 56 detects a voltage proportional to a first voltage of the main capacitor 51 charged before discharge and converts the detected voltage to a digital signal.

A light quantity calculating means 57 calculates a desirable quantity of light required to illuminate a photographed object based on photographing information such as ISO information of a film, diaphragm information of a camera, information of a distance from the camera to the photographed object, etc. Sections of the distance information, the ISO information and the diaphragm information are respectively designated by reference numerals 58, 59 and 60. A voltage calculating means 61 calculates a third voltage of the main capacitor 51 at a stopping time of light emission after energy corresponding to the quantity of light required to illuminate the photographed object is discharged from the main capacitor. The third voltage of the main capacitor 51 is calculated by the voltage calculating means 61 based on the digital signal indicative of the above voltage proportional to the first voltage, basic guide number information and stroboscopic zoom information. Sections of the basic guide number information and the stroboscopic zoom information are respectively designated by reference numerals 62 and 66.

A digital/analog converter (D/A converter) 63 converts a digital signal indicative of a voltage proportional to the calculated third voltage to an analog signal. A comparing means 64 compares a voltage $V_B$ proportional to the third voltage and outputted from the D/A converter 63 with a voltage $V_A$ proportional to a second voltage of the main capacitor 51 reduced after the discharging operation is started. When these voltages $V_A$ and $V_B$ are in conformity with each other, the comparing means 64 outputs a signal for stopping the light emission. The light quantity calculating means 57 and the voltage calculating means 61 are disposed together with each other within a calculating section 65. The basic guide number information of section 62 in a stroboscope is also stored into this calculating section 65 in advance.

The operation of the flashing apparatus of an automatic light-adjusting type in the fourth embodiment will next be described.

The voltage of a battery is increased by the DC/DC converter 52 and is applied to the main capacitor 51 to charge the main capacitor 51. A voltage of the main capacitor 51 is partially divided by resistors $R_1$ and $R_2$ and is converted by the A/D converter 56 to a digital signal as the first voltage before discharge. The light quantity calculating means 57 calculates a desirable quantity of light required to illuminate the photographed object based on the photographing information such as the information of a distance from the camera to the photographed object in section 58, the ISO information of a film in section 59, the diaphragm information of the camera in section 60, etc. This desirable quantity of light shows a guide number. The photographed object may be illuminated by correcting exposure in accordance with the liking of a photographer.

The quantity of light required to illuminate the photographed object and calculated by the light quantity calculating means 57 is obtained on the basis of the digital signal indicative of the above voltage proportional to the first voltage, the basic guide number information of section 62 and the stroboscopic zoom information of section 66. To obtain such a quantity of light, the voltage calculating means 61 calculates a value of the third voltage of the main capacitor 51 reduced and allowed to charge the main capacitor and outputs a voltage proportional to this value. This output signal is converted to an analog signal by the D/A converter 63 and is inputted to a minus terminal of the comparing means 64.

When the contact X is closed at the photographing time and a trigger voltage is applied to the light emitting tube 53 by the trigger means 54, an electric current flows through the light emitting tube 53 from the main capacitor 51, thereby starting light emission of the light emitting tube 53. The voltage of the main capacitor 51 is rapidly reduced in accordance with this light emission. When a voltage $V_A$ proportional to the changing second voltage is in conformity with a voltage $V_B$ proportional to the third voltage, the comparing means 64 outputs a signal for stopping the light emission to the light emission stopping means 55. Thus, the light emission stopping means 55 is operated to stop the light emission of the light emitting tube 53.

A calculating method for setting the above voltage $V_B$ proportional to the third voltage is similar to the above-mentioned method. Namely, a voltage provided by reducing the voltage $V_{TX}$ calculated by the above formula (21) or (22) at the same ratio as a partial voltage ratio determined by resistance values $R_1$ and $R_2$ is outputted as the output voltage $V_B$ of the D/A converter 63. This output voltage $V_B$ is represented as follows.

$$V_B = \frac{R_2}{R_1 + R_2} \times V_{TX} \tag{27}$$

A method for calculating the voltage $V_{TX}$ at a zoom stroboscopic time will next be described.

Zoom information from a zoom stroboscope is represented as follows.

$$Z = f(z) \tag{28}$$

In this formula (28), reference numeral z and Z respectively designate zoom position information from the zoom stroboscope and a counting number at magnification with respect to the known basic guide number $GNo._o$. In this case, a basic guide number $GNo._{oz}$ at a zooming time with respect to the basic guide number $GNo._o$ is represented as follows.

$$G No._{oz} = G No._o \times Z \tag{29}$$

When the guide number represented by the formula (29) is substituted for the basic guide number represented by the formula (22), the following formula (30) is obtained.

$$V_{TX}^2 = V_{HX}^2 - \frac{G No._x^2}{G No._o^2 \cdot Z^2}(V_{HO}^2 - V_{TO}^2) \tag{30}$$

When a calculation similar to the simplified calculation from the formula (21) to the formula (26) is performed, the following formula (31) is obtained.

$$V_{TX}^2 = \left(1 - \frac{G No._x^2}{G No._o^2 \cdot Z^2}\right) V_{HO}^2 \tag{31}$$

Thus, the value $V_{TX}$ is calculated from the formula (31).

In accordance with the above fourth embodiment of the present invention, it is possible to calculate a reduced voltage of the main capacitor for providing a suitable quantity of light by changing only the value of the known basic guide number used for calculation in accordance with the stroboscopic zoom information. Further, it is possible to control the quantity of emitted light to be suitable in an arbitrary zooming position by stopping the light emission using this reduced voltage. Therefore, it is not necessary to dispose a complicated mechanism for controlling the diaphragm, etc. as in the general flashing apparatus so that the cost of the flashing apparatus can be reduced and the flashing apparatus can be reliably constructed. Further, since the diaphragm is arbitrarily selected, it is possible to set a depth of the photographed object to a value according to the intention of a photographer.

In the respective calculating formulas mentioned above, a difference between a calculated value of the guide number and the really obtained guide number is caused in a region in which the quantity of emitted light required to illuminate the photographed object is small, i.e., in a region in which the guide number to be obtained is small. This difference in guide number is not constant in accordance with a value of the first voltage of the main capacitor 51 before the light emission as shown in FIG. 12.

Figure 12:
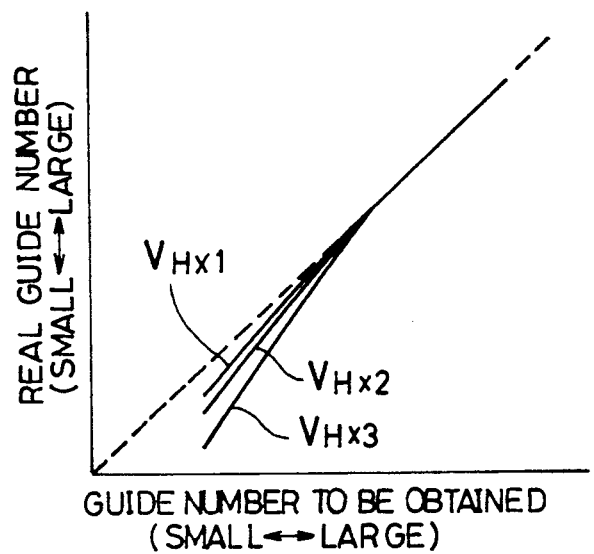
FIG. 12 is a graph showing an error between a guide number to be obtained and the actually obtained guide number.

In FIG. 12, each of voltages $V_{HX1}$, $V_{HX2}$ and $V_{HX3}$ is the first voltage and these voltages satisfy the following condition.

$$V_{HX1} < V_{HX2} < V_{HX3}$$

Figure 11A:
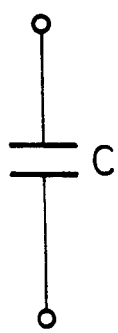
FIGS. 11a and 11b are diagrams showing equivalent circuits of ideal and actual capacitors.
Figure 11B:
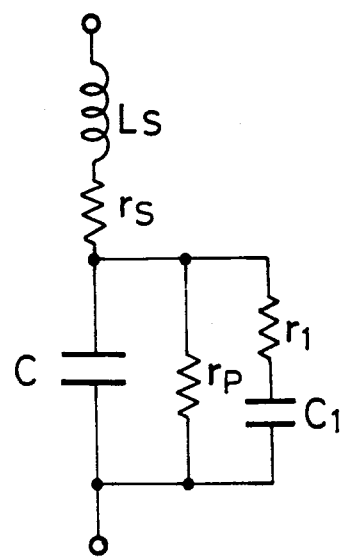

The difference in guide number is increased as the first voltage is increased. This difference in guide number is caused because the main capacitor 51 is treated as an ideal capacitor as shown in FIG. 11a. An equivalent circuit of the real capacitor is provided as shown in FIG. 11b. As shown in FIG. 11b, the equivalent circuit has an insulating resistor $r_p$, a resistor $r_1$ and a capacitor $C_1$ provided by dielectric polarization caused by a dielectric substance between electrodes, inductances such as lead wires, and resistors $L_S$, $r_S$. Accordingly, there is a returning phenomenon of voltage after the light emission is stopped.

Figure 9:
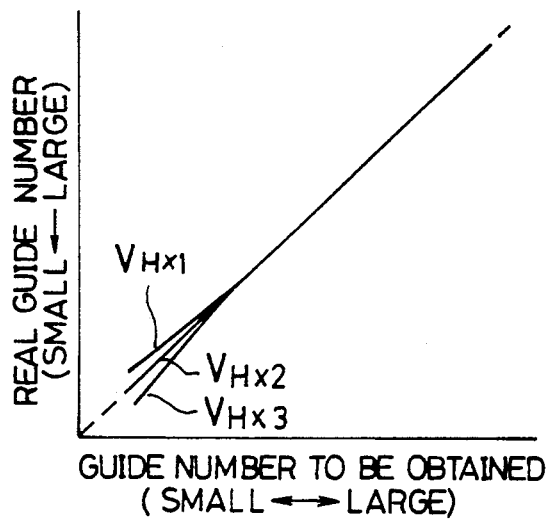
FIG. 9 is a characteristic graph of a guide number corrected by a constant correction value.

Namely, after the light emission is started at voltage $V_{HX}$, the light emission is stopped at preset voltage $V_{TX}$. However, in reality, the voltage of the main capacitor is returned by a voltage $V_R$ after the light emission is stopped. Accordingly, no preset energy is discharged from the main capacitor by this voltage $V_R$. Therefore, it is sufficient to correct a voltage $(V_{TX} + V_R)$ stabilized after the stoppage of the light emission as the third voltage. Namely, the voltage $V_{TX}$ calculated from the formula (22) is corrected to a voltage $(V_{TX} - V_R)$. For example, when the voltage $V_{TX}$ is corrected in accordance with voltage $V_R$ provided when $V_{HX} = V_{HX2}$ in FIG. 12, the difference in guide number is provided as shown in FIG. 9.

Figure 10:
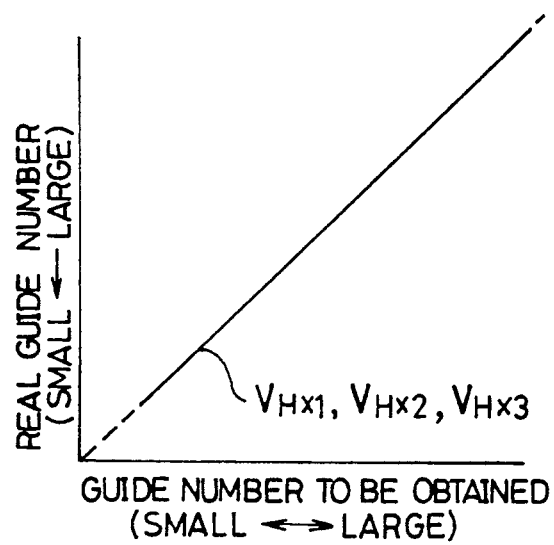
FIG. 10 is a characteristic graph of a guide number corrected by a correction value corresponding to a first voltage of the main capacitor.

When the operation of the flashing apparatus is controlled to emit light such that the voltage $V_{HX}$ is approximately constant, it is sufficient to correct the voltage $V_R$ as a constant value as mentioned above. However, when the voltage $V_{HX}$ is greatly changed, the difference in guide number is provided as shown in FIG. 10 by setting the voltage $(V_{TX}-V_R)$ to a stoppage voltage using voltage $V_R$ in accordance with a value of voltage $V_{HX}$. Thus, it is possible to control the operation of the flashing apparatus with high accuracy in an entire region from a small value of the guide number to a large value thereof even when the first voltages of the main capacitor 51 are different from each other.

The voltage $V_{HO}$ is calculated as a voltage of the main capacitor 51 at the full charging time thereof. However, this voltage $V_{HO}$ is not limited to the voltage of the main capacitor at the full charging time thereof. The voltage $V_{HO}$ may be an arbitrary value if this voltage is a voltage for allowing light emission. Namely, the voltage $V_{HO}$ may be a voltage corresponding to the known guide number. The above calculating formulas can be used as they are even when the voltage $V_{HO}$ is a voltage corresponding to the known guide number. Similar effects are also obtained in the case of voltage $V_{TO}$.

In the above description, the voltage of the main capacitor 51 is corrected with respect to an error in voltage thereof caused by dielectric polarization. However, it is also possible to correct the voltage of the main capacitor 51 with respect to this error and an error in voltage caused by resistances of lead wires, etc. caused by a large electric current flowing through the main capacitor during the light emission.

Figure 13:
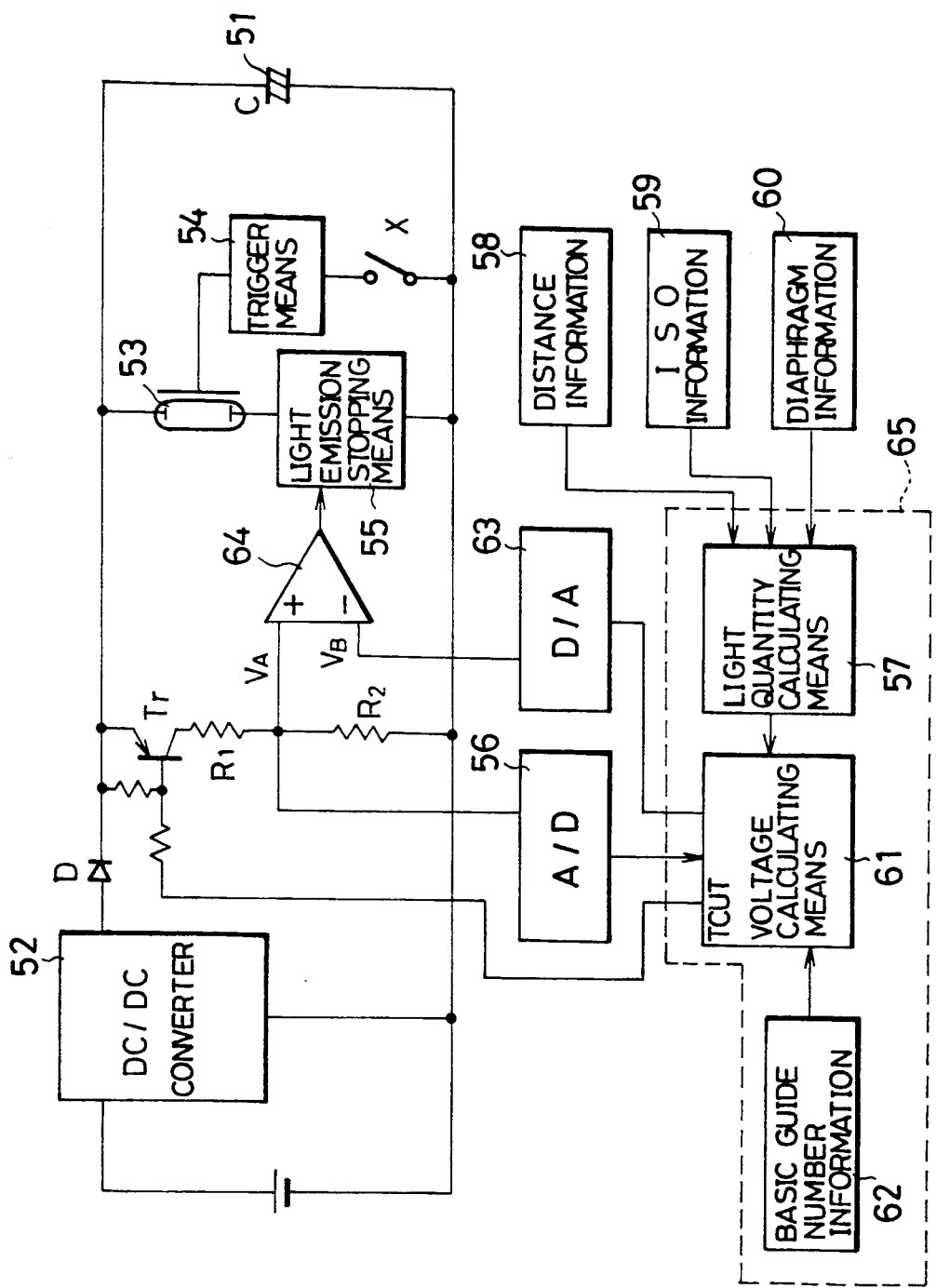
FIG. 13 is a view showing the construction of a flashing apparatus of an automatic light-adjusting type in a fifth embodiment of the present invention.

FIG. 13 shows the construction of a flashing apparatus of an automatic light-adjusting type of a fifth embodiment of the present invention. A basic construction of this flashing apparatus is similar to that in the fourth embodiment shown in FIG. 8. In this fifth embodiment, a circuit for providing voltages proportional to first and second voltages of a main capacitor 51 is composed of a resistor voltage-dividing circuit having a transistor Tr for switching and resistors $R_1$ and $R_2$ connected in series to each other. Turning-on and turning-off operations of the transistor Tr are controlled by a voltage calculating means 61.

The operation of the flashing apparatus of an automatic light-adjusting type in the fifth embodiment will next be described.

No electric current flows through the transistor Tr by a control signal TCUT transmitted from the voltage calculating means 61 to the transistor Tr so that the transistor Tr is in a standby state. The voltage of a battery is increased by a DC/DC converter 52 and is applied to the main capacitor 51 to charge the main capacitor 51. When a voltage level of the control signal TCUT is set to a low level "L", an electric current flows through the transistor Tr. Thus, a voltage of the main capacitor 51 is partially divided by the resistors $R_1$ and $R_2$ and is converted to a digital signal by an A/D converter 56 as the first voltage before discharge. No electric current flows through the transistor Tr by the control signal TCUT so that the transistor Tr attains the standby state again. At a photographing time, the voltage level of the control signal TCUT is set to the low level "L" and a contact X is then closed. When a trigger voltage is applied to a light emitting tube 53 by a trigger means 54, an electric current flows through the light emitting tube 53 from the main capacitor 51, thereby starting light emission. The second voltage of the main capacitor 51 is rapidly reduced in accordance with this light emission. When a voltage $V_A$ proportional to this changing second voltage is in conformity with a voltage $V_B$ proportional to a third voltage of the main capacitor 51, a comparing means 64 outputs a signal for stopping the light emission to a light emission stopping means 55. Thus, the light emission stopping means 55 is operated to stop the light emission of the light emitting tube 53. After the stoppage of the light emission, no electric current flows through the transistor Tr by the control signal TCUT so as to prevent subsequent useless discharge of the main capacitor 51.

As mentioned above, the transistor Tr for switching as a switching means is disposed in a circuit for providing the voltage of the main capacitor 51 such that an electric current flows through this transistor only when necessary. Accordingly, there is no leaked energy through a voltage-dividing resistor from the main capacitor 51 so that there is no difference in detected voltage at the light emitting time, thereby performing a light-adjusting operation with high accuracy. There is also no leaked energy through the voltage-dividing resistors $R_1$ and $R_2$ for a standby time between photographing operations. Accordingly, it is possible to rapidly perform the next photographing operation and prevent consumption of the battery by charging the battery again.

Figure 14:
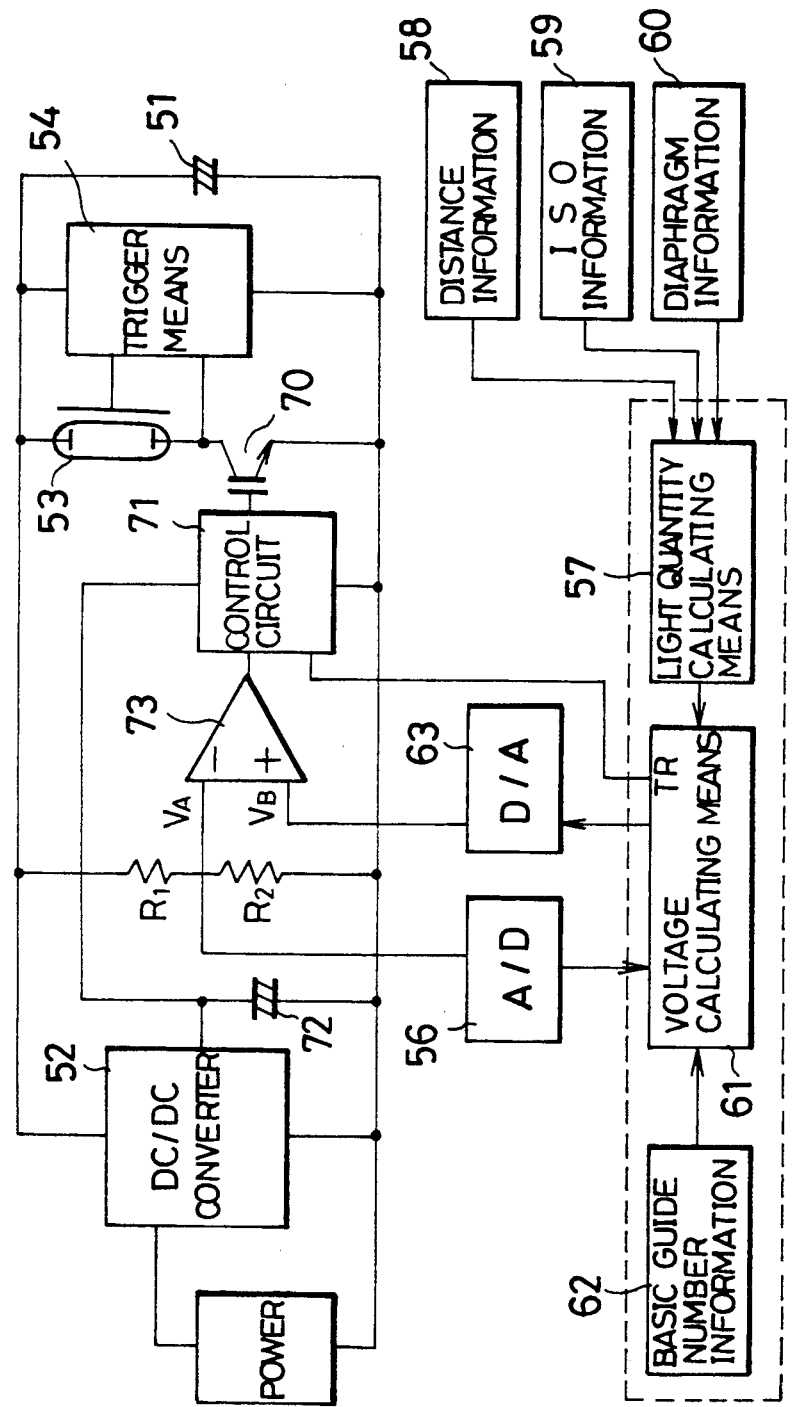
FIG. 14 is a view showing the construction of a flashing apparatus of an automatic light-adjusting type in a sixth embodiment of the present invention.

FIG. 14 shows the construction of a flashing apparatus of an automatic light-adjusting type of a sixth embodiment of the present invention. In FIG. 14, constructional members corresponding to those in the fourth embodiment shown in FIG. 8 are designated by the same reference numerals. An insulated gate bipolar transistor (IGBT) 70 is disposed within a discharging loop of a main capacitor 51 through a light emitting tube 53 of a stroboscope. A control circuit 71 applies a constant voltage to a gate of the insulated gate bipolar transistor 70. A second capacitor 72 holds and supplies this constant voltage to the gate of the insulated gate bipolar transistor 70. A comparing means 73 outputs a turning-off signal described later to the control circuit 71.

In the above sixth embodiment, the voltage of a power source is increased by a DC/DC converter 52 as a voltage-increasing circuit to charge the main capacitor 51 and the second capacitor 72. When a signal for starting light emission is inputted to the control circuit 71, the control circuit 71 applies a voltage of the second capacitor 72 to the gate of the insulated gate bipolar transistor 70. Thus, the insulated gate bipolar transistor 70 is turned on and an electric current flows between a collector and an emitter of the insulated gate bipolar transistor 70. Thus, a trigger means 54 is operated to excite the light emitting tube 53, thereby starting light emission.

A voltage of the main capacitor 51 is reduced by this light emission so that a voltage $V_A$ partially divided by resistors $R_1$ and $R_2$ is reduced. When the partially divided voltage $V_A$ is less than an output voltage $V_B$, an output of the comparing means 73 is inverted. The control circuit 71 receives the inverted output of the comparing means 73 and stops the application of a voltage of the second capacitor 72 to the gate of the insulated gate bipolar transistor 70. Thus, the insulated gate bipolar transistor 70 is turned off and no electric current flows between the collector and the emitter of the insulated gate bipolar transistor 70, thereby stopping the light emission.

Figure 15:
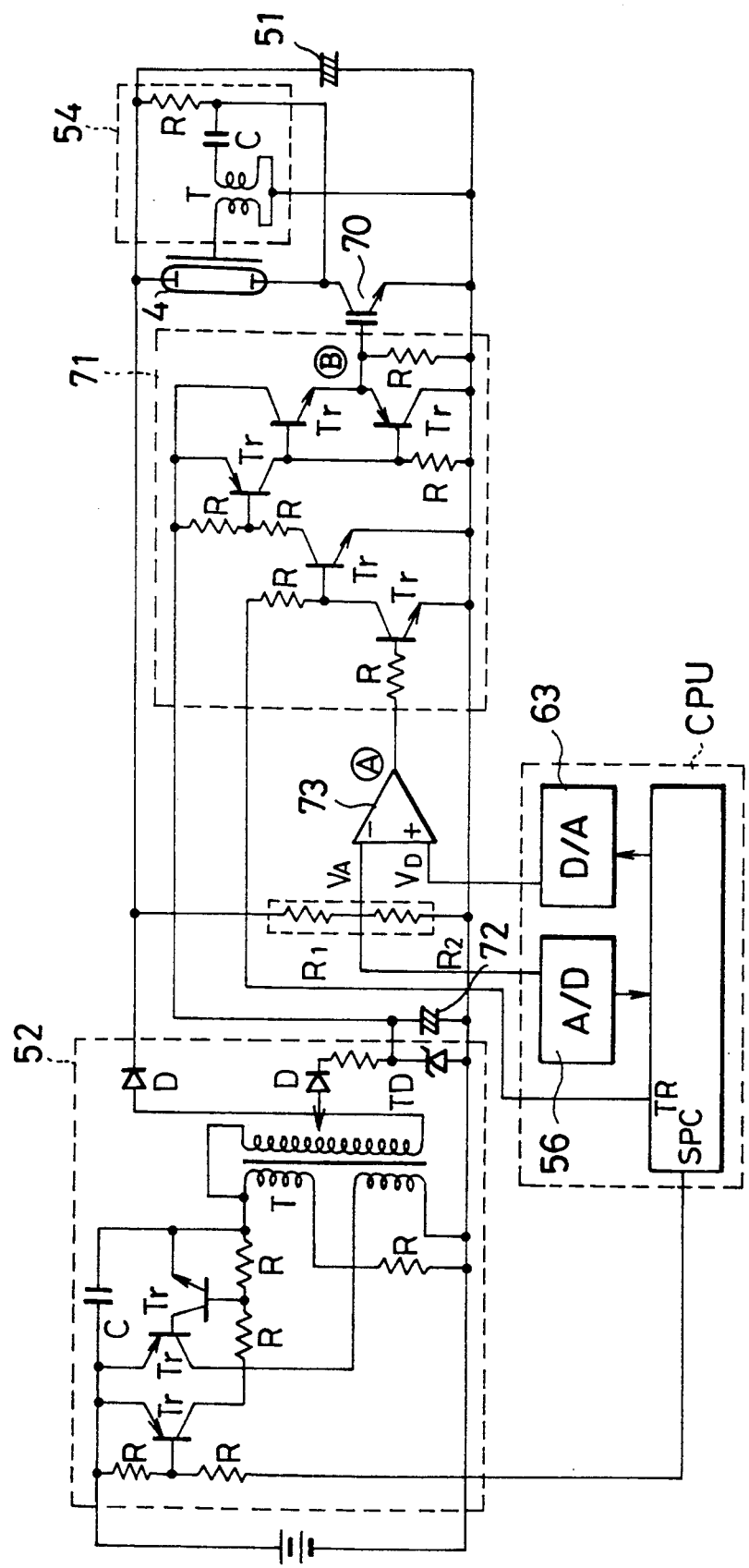
FIG. 15 is a diagram of a concrete circuit constituting the flashing apparatus of an automatic light-adjusting type in the sixth embodiment of the present invention.

FIG. 15 is a circuit diagram showing a concrete construction of the flashing apparatus in the sixth embodiment of the present invention shown in FIG. 14. The electric circuit shown in FIG. 15 has capacitors C, diodes D, a Zener diode TD, resistors R, transistors Tr, and transformers T. A central processing unit (CPU) includes the above A/D converter 56, the light quantity calculating means 57, the voltage calculating means 61, the D/A converter 63, etc. Reference numerals TR and SPC respectively designate terminals of the voltage calculating means 61 and the central processing unit.

Figure 7:
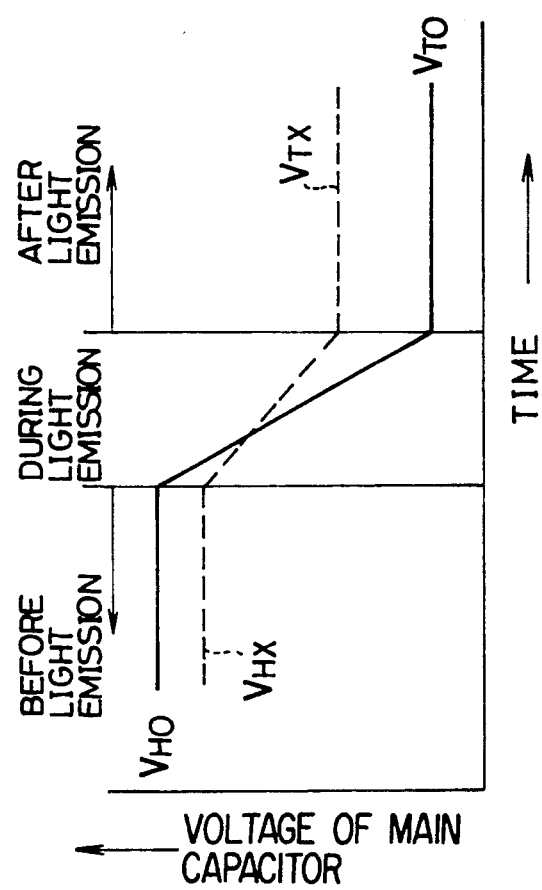
FIG. 7 is an explanatory view showing a change in voltage of a main capacitor before and after discharge.
Figure 16:
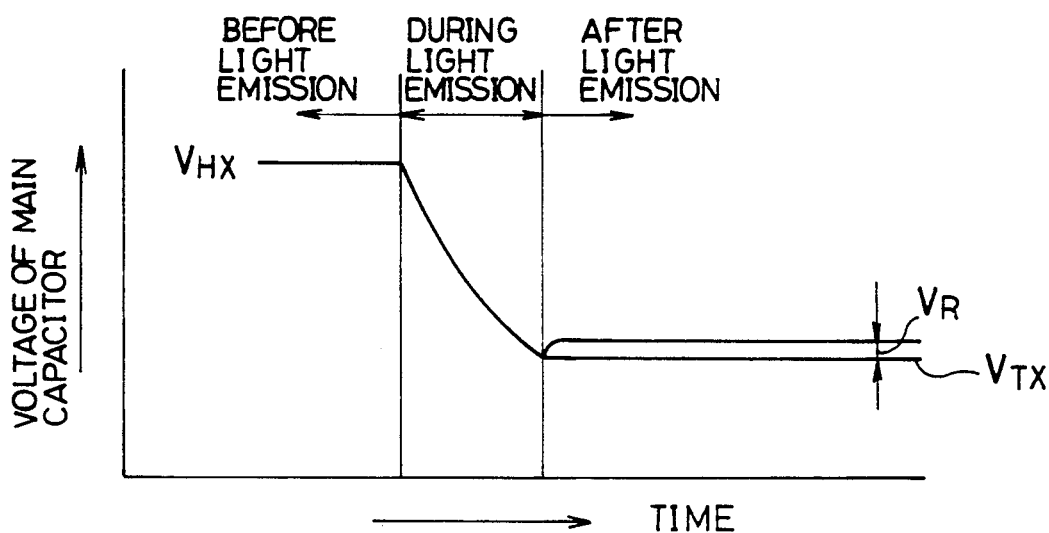
FIG. 16 is a view for explaining the view shown in FIG. 7 in detail.

FIG. 16 is an explanatory view showing the change in voltage of the main capacitor shown in FIG. 7 in detail. The application of the voltage of the main capacitor 51 is stopped at preset voltage $V_{TX}$ after light is emitted at voltage $V_{HX}$. After the application of the voltage of the main capacitor 51 is stopped, the voltage of the main capacitor 51 is returned by voltage $V_R$ as already mentioned above. Namely, the ideal capacitor C shown in FIG. 11a is considered to be the main capacitor 51 in the above-mentioned calculations. However, the real capacitor C is the equivalent circuit shown in FIG. 11b. Therefore, the voltage of the main capacitor 51 is returned by voltage $V_R$.

Figure 17:
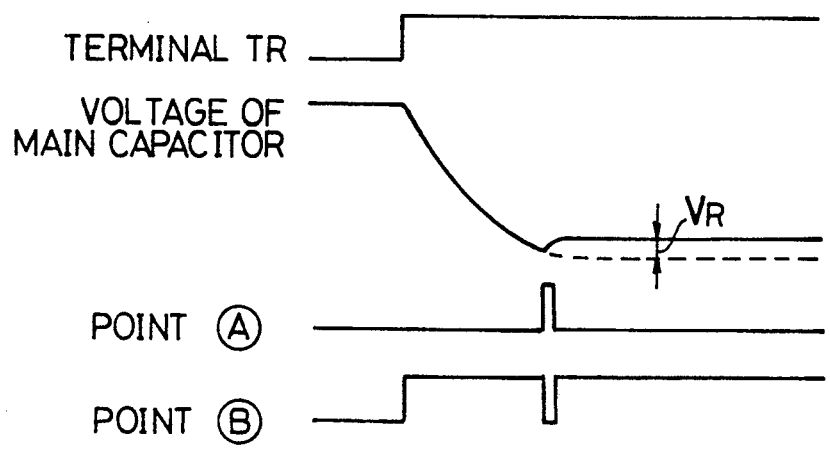
FIG. 17 is a timing chart of constructional portions of the concrete circuit shown in FIG. 15.

FIG. 17 shows a timing chart of respective constructional portions shown in FIG. 15 when the above voltage $V_R$ is generated. After the stoppage of the light emission, the voltage of the main capacitor 51 is increased by the generation of the voltage $V_R$. After the insulated gate bipolar transistor 70 receives a pulse output of the comparing means 73 at a point A, the insulated gate bipolar transistor 70 is still turned on by the application of a voltage of the control circuit 71 at a point B at which a voltage level of the control circuit 71 becomes a high level again. Accordingly, the second capacitor 72 continuously performs a discharging operation thereof and no capacitor C within the trigger means 54 is charged. Therefore, it is impossible to perform the next light emitting operation even when the voltage of the main capacitor 51 is a sufficient value.

Figure 18:
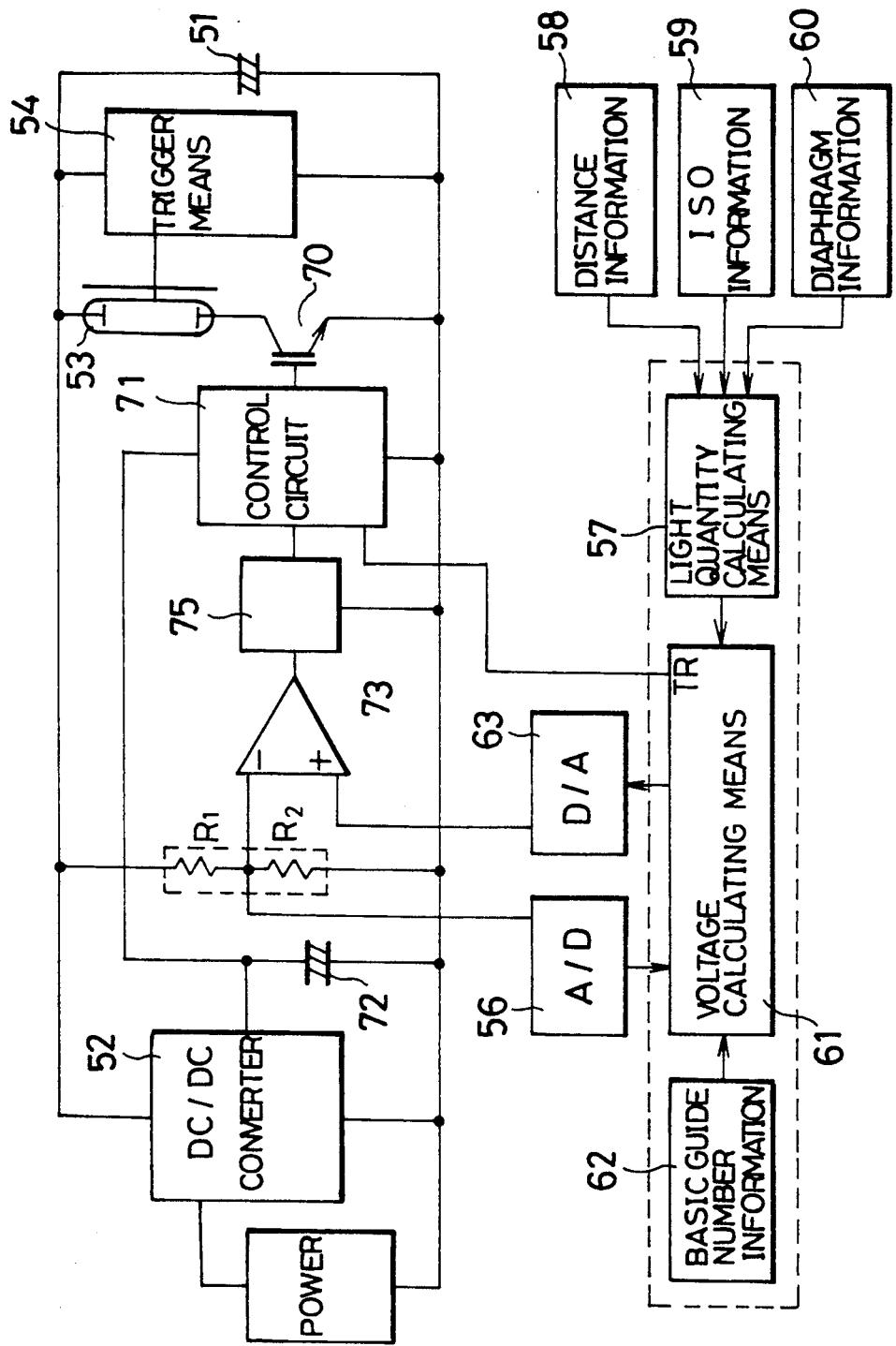
FIG. 18 is a view showing the construction of a flashing apparatus of an automatic light-adjusting type in a seventh embodiment of the present invention.

These problems are solved by a flashing apparatus of an automatic light-adjusting type in a seventh embodiment of the present invention shown in FIG. 18. The construction of this flashing apparatus in the seventh embodiment is basically similar to that in the sixth embodiment shown in FIG. 14 except that an output holding circuit 75 is disposed on an output side of the comparing means 73. This output holding circuit 75 is constructed by a concrete electric circuit shown in FIG. 19.

Figure 19:
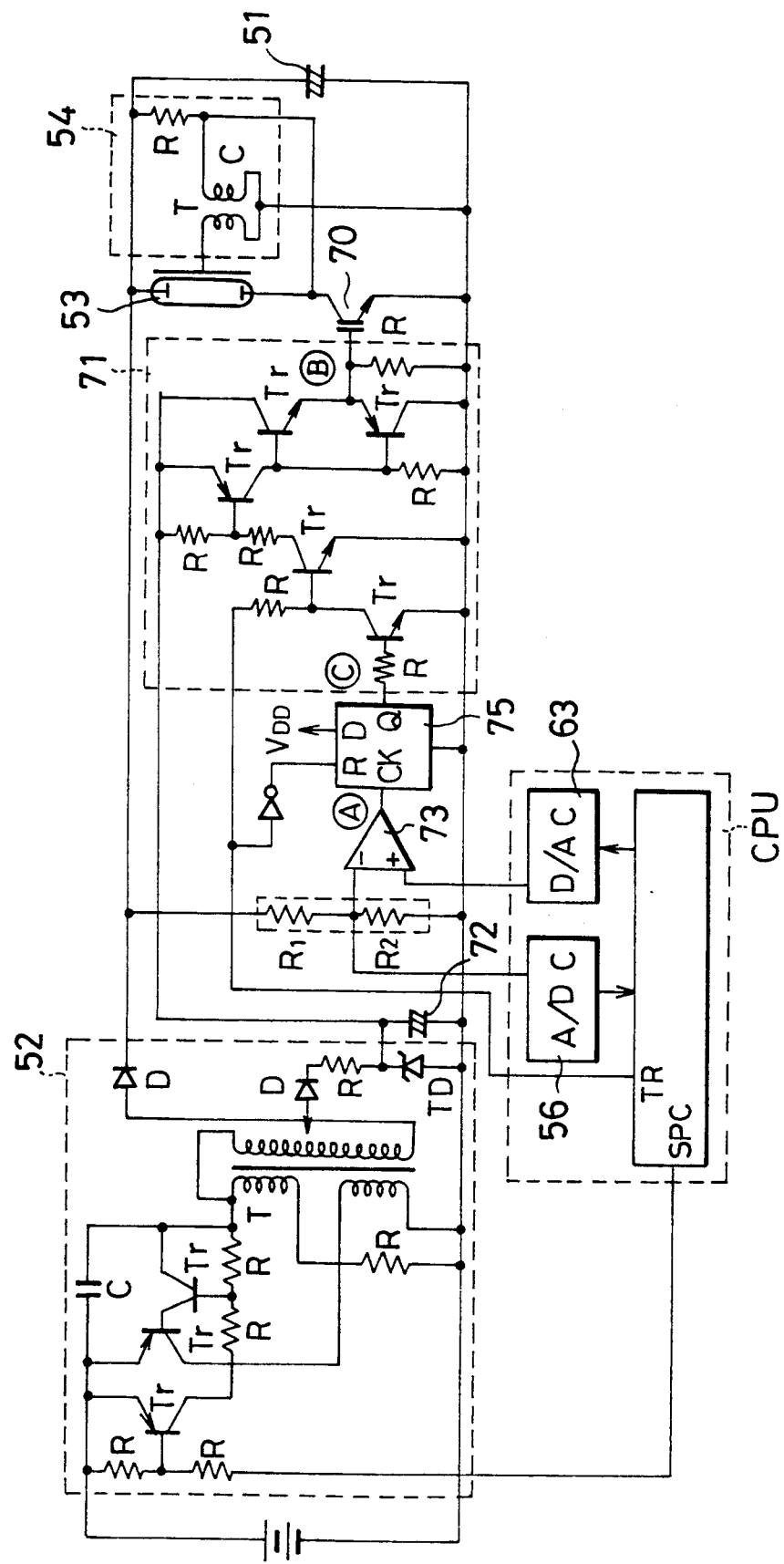
FIG. 19 is a diagram of a concrete circuit constituting the flashing apparatus of an automatic light-adjusting type in the seventh embodiment of the present invention.
Figure 20:
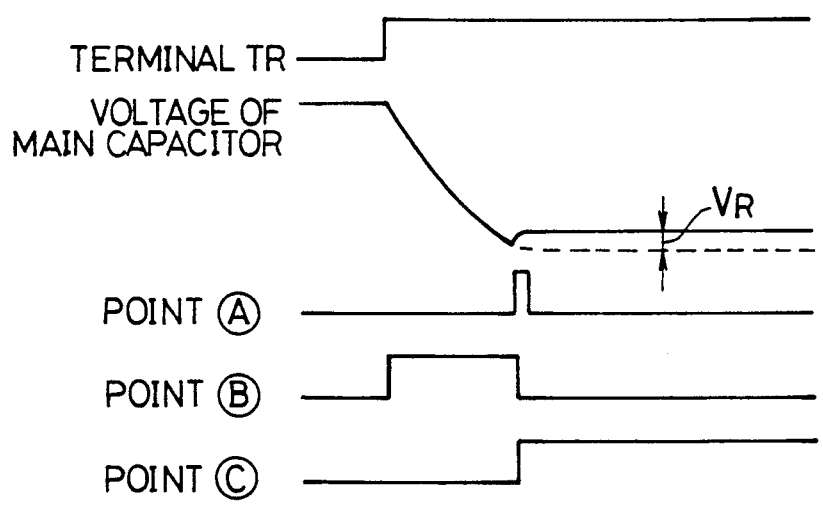
FIG. 20 is a timing chart of constructional portions of the concrete circuit shown in FIG. 19.

In this seventh embodiment, a return voltage $V_R$ is generated as shown by a timing chart of FIG. 20 with respect to respective constructional portions shown in FIG. 19. When this return voltage $V_R$ is generated and a pulse indicative of this return voltage is outputted by the comparing means 73 at a point A, an output state of the comparing means 73 is held by the output holding circuit 75 as shown by a rise of voltage at a point C. Accordingly, a level of the voltage of the control circuit 71 applied to the insulated gate bipolar transistor 70 reliably becomes a low level after discharge as shown by a fall of voltage at a point B so that no insulated gate bipolar transistor 70 is turned on in error.

As mentioned above, in the seventh embodiment, it is possible to prevent an operating state of the insulated gate bipolar transistor 70 from being changed from the turning-off state to the turning-on state in error. Accordingly, an operating state of the gate of the insulated gate bipolar transistor 70 is stabilized and no gate voltage is uselessly consumed. Further, after the stoppage of the light emission, the capacitor C within the trigger means 54 is charged without any problem so that the light emitting operation can be reliably performed repeatedly.

Figure 21:
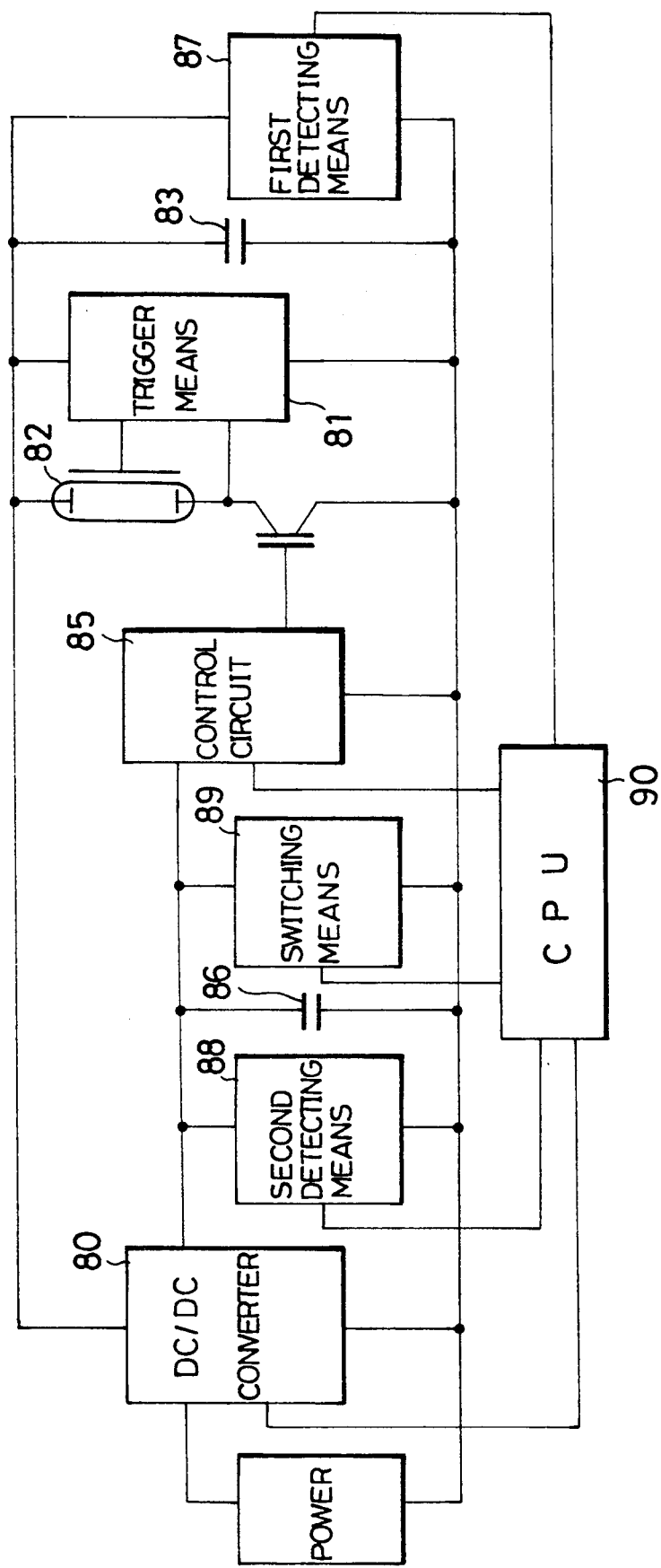
FIG. 21 is a view showing the construction of a flashing apparatus of an automatic light-adjusting type in an eighth embodiment of the present invention.

FIG. 21 shows the construction of a flashing apparatus of an automatic light-adjusting type of an eighth embodiment of the present invention. In FIG. 21, reference numerals 80, 81 and 82 respectively designate a DC/DC converter, a trigger means and a light emitting tube. A main capacitor 83 is used as a light source of a stroboscope. An insulated gate bipolar transistor (IGBT) 84 is disposed within a discharging loop of the main capacitor 83 through the light emitting tube 82. A control circuit 85 applies a constant voltage to a gate of the insulated gate bipolar transistor 84. A second capacitor 86 holds and supplies this constant voltage to the gate of the insulated gate bipolar transistor 84. A first detecting means 87 detects a charged voltage level of the main capacitor 83. A second detecting means 88 detects a charged voltage level of the second capacitor 86. The charged voltage of the second capacitor 86 can be outputted by a switching means 89. CPU 90 designates a central processing unit.

Figure 22:
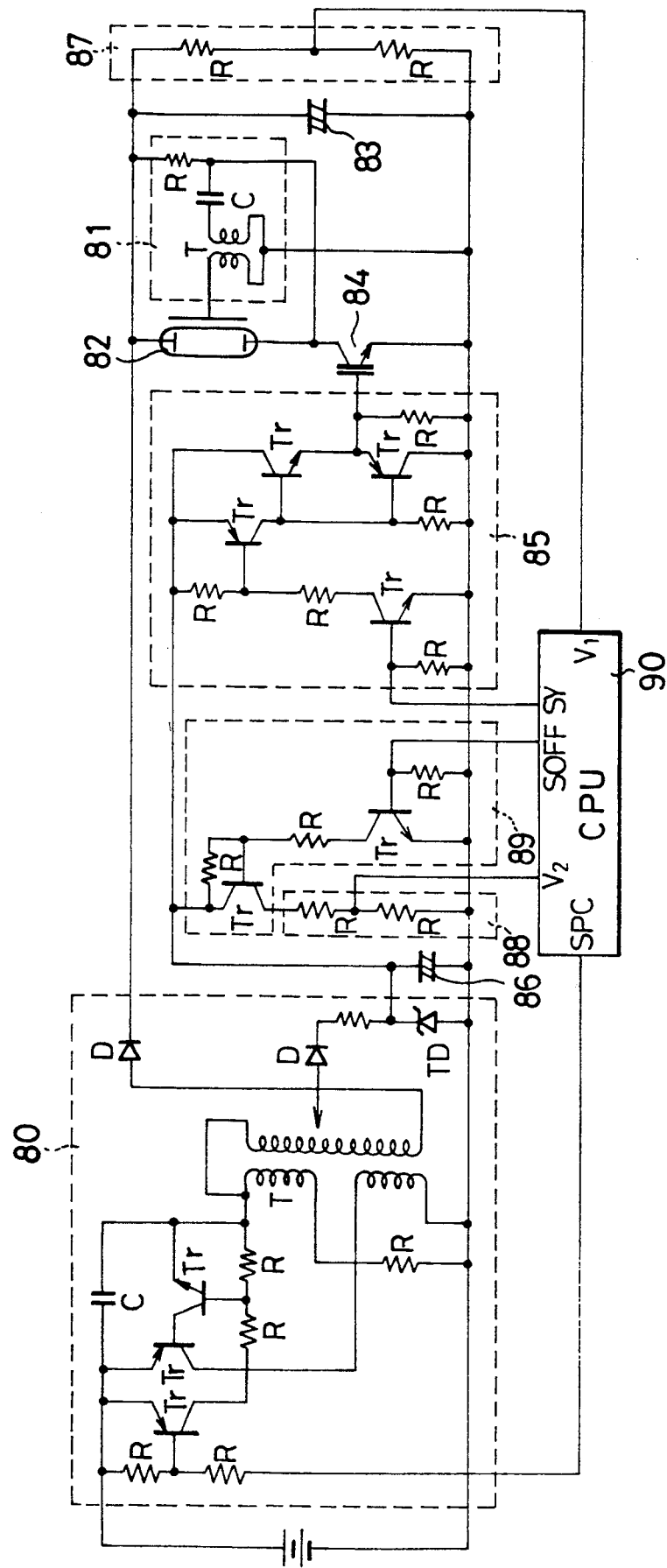
FIG. 22 is a diagram of a concrete circuit constituting the flashing apparatus of an automatic light-adjusting type in the eighth embodiment of the present invention.

FIG. 22 is a circuit diagram showing a concrete construction of the flashing apparatus of the eighth embodiment shown in FIG. 21. The electric circuit shown in FIG. 22 has capacitors C, diodes D, a Zener diode TD, resistors R, transistors Tr and transformers T. The first detecting means 87 and the second detecting means 88 are constructed by connecting the resistors R in series to each other.

In FIG. 22, in an initial state of the central processing unit 90, a port SPC is opened and each of ports SOFF and SY has a low voltage level or is opened. When the port SPC has a low voltage level, a DC/DC converter 80 connected to a power source is operated so that the main capacitor 83 and the second capacitor 86 begin to be charged. The central processing unit 90 detects charging states of the main capacitor 83 and the second capacitor 86 by an output voltage $V_1$ detected by the first detecting means 87 and an output voltage $V_2$ detected by the second detecting means 88. At this time, the output voltage $V_2$ can be outputted by setting the voltage level of the port SOFF to a high voltage level so as to operate the switching means 89. The second capacitor 86 and the second detecting means 88 are connected and disconnected from each other by the operation of this switching means 89. Thus, it is possible to minimize a discharging amount of the second capacitor 88 by the detection of the output voltage $V_2$.

There are analog outputs with respect to the output voltages $V_1$ and $V_2$ by the constructions of the detecting means 87 and 88. The central processing unit 90 converts these analog output signals to digital signals. Otherwise, levels of the output voltages are compared with preset voltage levels. Thus, it is judged whether or not the levels of the output voltages are levels for allowing light emission. When the levels of the output voltages $V_1$ and $V_2$ reach the preset voltage levels, the operating states of the ports SPC and SOFF in the central processing unit 90 are returned to their initial states, thereby stopping the operation of the DC/DC converter 80, i.e., an oscillating operation of a voltage-increasing circuit disposed therein.

When the levels of the output voltages $V_1$ and $V_2$ are the preset levels, it is possible to perform a photographing operation. When the voltage level of the port SY in the central processing unit 90 is set to a high voltage level in synchronization with the operation of an unillustrated exposure mechanism, the control circuit 85 is operated and a voltage stored to the second capacitor 86 is applied to the gate of the insulated gate bipolar transistor 84. Thus, an electric current flows between a collector and an emitter of the insulated gate bipolar transistor 84. Therefore, the light emitting tube 82 attains a light emitting state by the trigger means 81. Thus, light is emitted from the light emitting tube 82 by the operation of a discharging loop provided with the main capacitor 83, the light emitting tube 82 and the insulated gate bipolar transistor 84.

When a quantity of the emitted light has reached a predetermined value, the voltage level of the port SY in the central processing unit 90 is set to a low level. Thus, no electric current flows through the insulated gate bipolar transistor 84, thereby stopping the light emission.

As mentioned above, the light emitting operation is reliably performed and no excessive load is applied to the insulated gate bipolar transistor 84 so that it is possible to prevent the insulated gate bipolar transistor from being broken. Further, the light emitting operation is secured by the detection of the levels of the output voltages $V_1$ and $V_2$ when light is continuously emitted or is again emitted after the light emission is stopped. Accordingly, no charging operation is uselessly performed and no time lag is caused. The above switching means 89 may be disposed when necessary.

Figure 23:
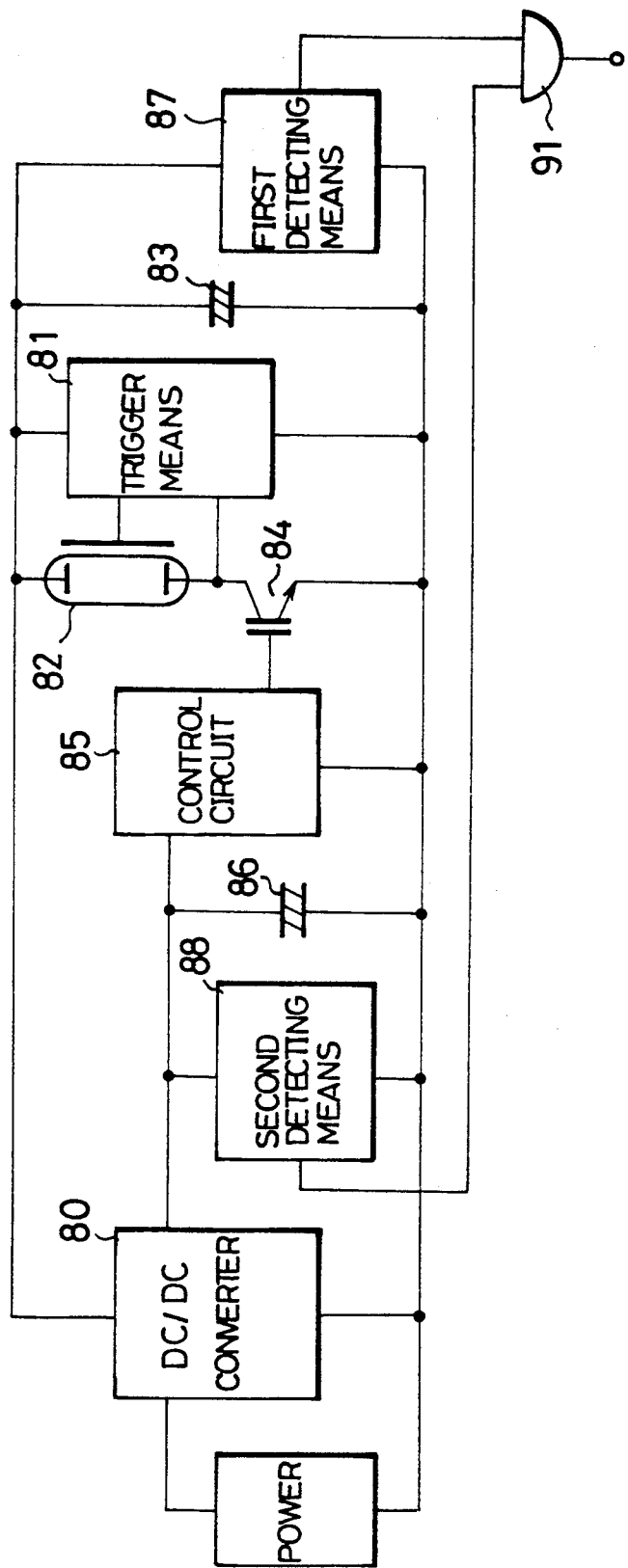
FIG. 23 is a view showing the construction of a flashing apparatus of an automatic light-adjusting type in a ninth embodiment of the present invention.

FIG. 23 shows the construction of a flashing apparatus of an automatic light-adjusting type of a ninth embodiment of the present invention. In this ninth embodiment, the flashing apparatus has a comparing means 91 for comparing detected outputs of the first detecting means 87 and the second detecting means 88 in the above eighth embodiment with each other. When voltage levels of the main capacitor 83 and the second capacitor 86 are greater than preset voltage levels, a signal for allowing light emission is outputted to a suitable control means, etc.

In the above ninth embodiment, it is possible to detect two outputs of the first and second detecting means 87 and 88 in the eighth embodiment by one comparing means 91. Therefore, it is possible to reduce the number of ports in the central processing unit 90 when the signal for allowing light emission is outputted to the central processing unit 90 in the eighth embodiment.

Figure 24:
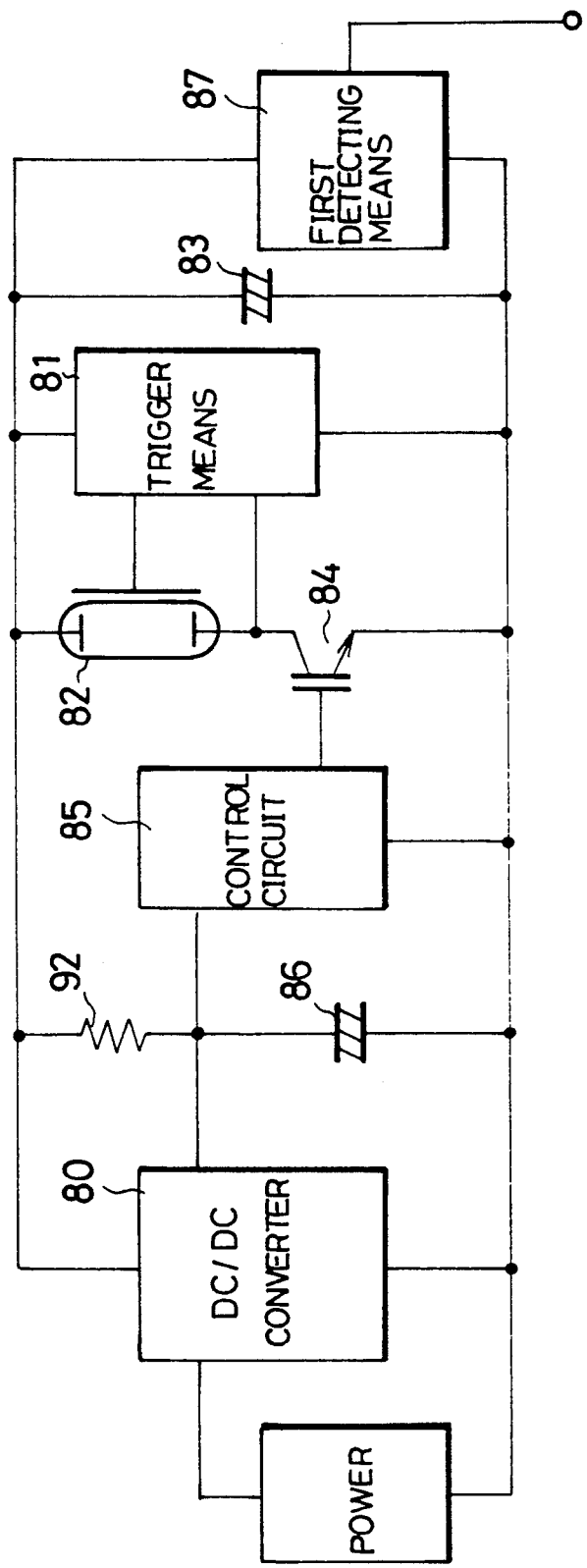
FIG. 24 is a view showing the construction of a flashing apparatus of an automatic light-adjusting type in a tenth embodiment of the present invention.

FIG. 24 shows the construction of a flashing apparatus of an automatic light-adjusting type of a tenth embodiment of the present invention. In this tenth embodiment, a main capacitor 83 and a second capacitor 86 are connected to each other through a resistor 92 having a high resistance value so as to secure the prevention of a current leak between the main capacitor 83 and the second capacitor 86. Further, it is not necessary to dispose the second detecting means 88 in each of the eighth and ninth embodiments by backup of the second capacitor 86 using the main capacitor 83.

Namely, no second detecting means 88 is disposed since a voltage of the main capacitor 83 for allowing light emission is higher than a required voltage of the second capacitor 86. Thus, the light emitting operation can be reliably performed by using only the first detecting means 87 and it is possible to prevent an insulated gate bipolar transistor 84 from being broken.

A resistor having a high resistance value may be disposed between the control circuit 85 and the second capacitor 86 in the eighth and ninth embodiments to secure a consuming amount of the second detecting means 88.

Figure 25C:
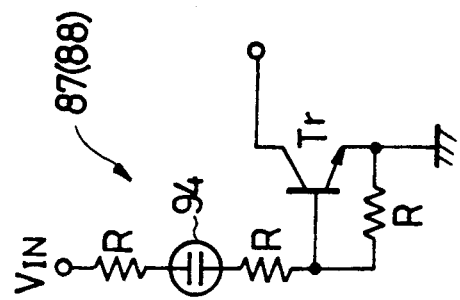
FIGS. 25a, 25b and 25c are circuit diagrams showing another examples of first and second detecting means.
Figure 25B:
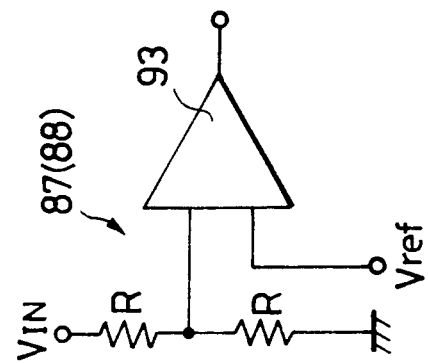
Figure 25A:
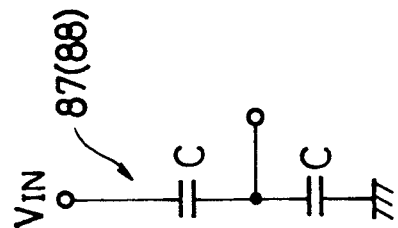

FIGS. 25a to 25c are diagrams of voltage circuits showing other examples of the first and second detecting means 87 and 88. In FIG. 25a, a pair of capacitors C are connected in series to each other and a detected voltage level is outputted as an analog value. In FIG. 25b, a comparator 93 is connected between resistors R connected in series to each other. In FIG. 25c, three resistors R are connected in series to each other and a neon tube 94 and a transistor Tr are connected between these resistors R. In the detecting means 87 and 88 shown in FIGS. 25b and 25c, a detected voltage level is outputted as a digital value.

As mentioned above, in first and second structures of the present invention, an energy amount or voltage corresponding to the quantity of light required to perform a photographing operation is applied to a light emitting tube connected to a main capacitor. The operation of the light emitting tube is controlled by calculating this energy amount or voltage in advance. Accordingly, a light emitting operation is controlled with high accuracy without any influence of reflectivities of a photographed object and a film on the operation of the flashing apparatus. Further, it is not necessary to dispose a photometric circuit in the general flashing apparatus so that the cost of the flashing apparatus and a space therefor can be reduced.

In a third structure of the present invention, when the quantity of light required to perform the photographing operation is obtained from a voltage of the main capacitor just before discharge, a voltage value of the main capacitor reduced and allowed to discharge the main capacitor is calculated to control the operation of the light emitting tube, thereby controlling the light emitting operation with high accuracy.

In a fourth structure of the present invention, analog/digital and digital/analog conversions are suitably performed in the calculation and comparison of voltages of respective constructional circuit portions in the flashing apparatus so that a processing of the flashing apparatus can be efficiently performed.

In a fifth structure of the present invention, a calculating processing of the flashing apparatus is performed by additionally using stroboscopic zoom information so that a usable range of the flashing apparatus can be widened.

In sixth and seventh structures of the present invention, a control operation of the flashing apparatus can be reliably performed since the calculated voltage is corrected in accordance with a region of the quantity of light.

In an eighth structure of the present invention, it is possible to prevent the main capacitor from being discharged since the voltage of the main capacitor is detected by operating a switching means when necessary.

In a ninth structure of the present invention, an insulated gate bipolar transistor used in a discharging loop is reliably turned off so that the control operation of the flashing apparatus can be performed with high accuracy in a range from a small guide number to a large guide number.

In tenth and eleventh structures of the present invention, a charging operation of each of plural capacitors can be controlled so that light can be reliably emitted and the insulated gate bipolar transistor can be protected.

Many widely different embodiments of the present invention may be constructed without departing from the spirit and scope of the present invention. It should be understood that the present invention is not limited to the specific embodiments described in the specification, except as defined in the appended claims.

What is claimed is:

1. A flashing apparatus of an automatic light-adjusting type for illuminating a photographed object by discharging a charge charged to a main capacitor in a light emitting tube, the flashing apparatus comprising:

energy amount detecting means for detecting an energy amount applied to the light emitting tube from the main capacitor, including voltage detecting means for detecting a voltage applied to the light emitting tube from the main capacitor, electric current detecting means for detecting an electric current flowing through said light emitting tube, multiplying means for multiplying the detected voltage by the detected electric current, and integrating means for integrating the multiplied results;

energy amount setting means for setting an amount of discharged energy of the main capacitor corresponding to a quantity of light required to illuminate the photographed object, including light quantity calculating means for calculating a quantity of light required to illuminate the photographed object based on photographing information such as information of a distance from a camera to the photographed object, sensitivity information of a film, diaphragm information, and voltage-current integrated value calculating means for calculating an integrated value of a product of an electric current and a voltage applied to said light emitting tube and corresponding to the calculated quantity of light;

comparing means for comparing the energy amount detected by said energy amount detecting means with the energy amount set by said energy amount setting means, including means for comparing an output of said integrating means with an output of said voltage-current integrated value calculating means and outputting a signal when both outputs are in conformity with each other; and light emission stopping means for stopping light emission of said light emitting tube according to said signal outputted from said comparing means when said comparing means detects that the discharged energy amount of said main capacitor is in conformity with the set amount of said energy amount setting means after the light emission is started.

2. A flashing apparatus of an automatic light-adjusting type for illuminating a photographed object by discharging a charge charged to a main capacitor in a light emitting tube, the flashing apparatus comprising:

energy amount detecting means for detecting an energy amount applied to the light emitting tube from the main capacitor, including voltage detecting means for detecting a first voltage of the main capacitor charged before discharge and a second voltage of said main capacitor reduced at a discharging time thereof, said voltage detecting means converting the first and second voltages to digital signals;

energy amount setting means for setting an amount of discharged energy of the main capacitor corresponding to a quantity of light required to illuminate the photographed object, including voltage calculating means for receiving the digital signal indicative of said first voltage and calculating a third voltage of said main capacitor based on photographing information such as basic guide number information and others after energy corresponding to the quantity of light required to illuminate the photographed object is discharged from the main capacitor, said voltage calculating means outputting a digital signal indicative of the third voltage;

comparing means for comparing the energy amount detected by said energy amount detecting means with the energy amount set by said energy amount setting means, including means for comparing the digital signal indicative of the third voltage outputted from said voltage calculating means with the digital signal indicative of said second voltage reduced after a discharging operation of the main capacitor is started, said comparing means outputting a signal for stopping light emission of the light emitting tube when the digital signals indicative of the second and third voltages are in conformity with each other; and light emission stopping means for stopping light emission of said light emitting tube according to said signal outputted from said comparing means when said comparing means detects that the discharged energy amount of said main capacitor is in conformity with the set amount of said energy amount setting means after the light emission is started.

3. A flashing apparatus as claimed in claim 2, wherein said voltage calculating means includes means for calculating the third voltage of said main capacitor based on a digital signal indicative of a voltage proportional to said first voltage, the basic guide number information and stroboscopic zoom information.

4. A flashing apparatus as claimed in claim 2, wherein said voltage calculating means has means for correcting said third voltage in a region in which the quantity of light required to illuminate the photographed object is small.

5. A flashing apparatus as claimed in claim 4, wherein said correcting means has means for correcting the third voltage in accordance with said first voltage of the main capacitor.

6. A flashing apparatus as claimed in claim 2, wherein a circuit for providing voltages proportional to the first and second voltages of said main capacitor is constructed by a resistor voltage-dividing circuit connected in series to switching means which is turned on to provide the voltages proportional to the first and second voltages only when necessary.

7. A flashing apparatus as claimed in claim 2, wherein said stopping means comprises an insulated gate bipolar transistor disposed within a discharging loop of said main capacitor through the light emitting tube, a control circuit for applying a constant voltage to a gate of said insulated gate bipolar transistor, and a second capacitor for holding and supplying said constant voltage, and wherein the insulated gate bipolar transistor is turned off through said control circuit when said second voltage is reduced and is less then the third voltage.

8. A flushing apparatus as claimed in claim 7, wherein said flashing apparatus further comprises first detecting means for detecting a level of the charged voltage of said main capacitor, second detecting means for detecting a level of a charge voltage of said second capacitor, and control means for controlling charging operations of the main and second capacitors by outputs of the first and second detecting means.

9. A flushing apparatus as claimed in claim 8, wherein the comparing means has means for outputting a signal for allowing the light emission when voltages of the outputs of said first and second detecting means are greater then predetermined values.

10. A flashing apparatus of an automatic light-adjusting type for illuminating a photographed object by discharging a charge charged to a main capacitor in a light emitting tube, the flashing apparatus comprising:
  energy amount detecting means for detecting an energy amount applied to the light emitting tube from the main capacitor, including an analog/digital converter for detecting and converting a voltage proportional to a first voltage of the main capacitor charged before discharge to a digital signal;
  energy amount setting means for setting an amount of discharged energy of the main capacitor corresponding to a quantity of light required to illuminate the photographed object, including light quantity calculating means for calculating a quantity of light required to illuminate the photographed object based on photographing information such as ISO information of a film, diaphragm information of a camera, and information of a distance from the camera to the photographed object, voltage calculating means for calculating a third voltage of said main capacitor based on basic guide number information and the digital signal indicative of said voltage proportional to the first voltage after energy corresponding to the quantity of light required to illuminate the photographed object is discharged from the main capacitor, and a digital/analog converter for converting a digital signal indicative of a voltage proportional to the calculated third voltage to an analog signal;
  comparing means for comparing the energy amount detected by said energy amount detecting means with the energy amount set by said energy amount setting means, including means for comparing the voltage proportional to the third voltage outputted from said digital/analog converter with a voltage proportional to a second voltage of said main capacitor reduced after a discharging operation of the main capacitor is started, said comparing means outputting a signal for stopping light emission of the light emitting tube when the voltages proportional to the second and third voltages are in conformity with each other; and
  light emission stopping means for stopping light emission of said light emitting tube according to said signal outputted from said comparing means when said comparing means detects that the discharged energy amount of said main capacitor is in conformity with the set amount of said energy amount setting means after the light emission is started.

11. A flashing apparatus an claimed in claim 10, wherein said voltage calculating means includes means for calculating the third voltage of said main capacitor based on the digital signal indicative of the voltage proportional to said first voltage, the basic guide number information and stroboscopic zoom information.

12. A flashing apparatus as claimed in claim 10, wherein said voltage calculating means has means for correcting said third voltage in a region in which the quantity of light required to illuminate the photographed object is small.

13. A flashing apparatus as claimed in claim 12, wherein said correcting means includes means for correcting the third voltage in accordance with said first voltage of the main capacitor.

14. A flashing apparatus as claimed in claim 10, wherein a circuit for providing the voltages proportional to the first and second voltages of said main capacitor is constructed by a resistor voltage-dividing circuit connected in series to switching means which is turned on to provide the voltages proportional to the first and second voltages only when necessary.

15. A flashing apparatus as claimed in claim 10, wherein said stopping means comprises an insulated gate bipolar transistor disposed within a discharging loop of said main capacitor through the light emitting tube, a control circuit for applying a constant voltage to a gate of said insulated gate bipolar transistor, and a second capacitor for holding and supplying said constant voltage, and wherein the insulated gate bipolar transistor is turned off through said control circuit when said second voltage is reduced and is less than the third voltage.

16. A flashing apparatus as claimed in claim 15, wherein said flashing apparatus further comprises first detecting means for detecting a level of the charged voltage of said main capacitor, second detecting means for detecting a level of a charged voltage of said second capacitor, and control means for controlling charging operations of the main and second capacitors by outputs of the first and second detecting means.

17. A flashing apparatus as claimed in claim 16, wherein the comparing means has means for outputting a signal for allowing the light emission when voltages of the outputs of said first and second detecting means are greater than predetermined values.

* * * * *